United States Patent [19]

Nagasawa

[11] Patent Number: 5,291,352
[45] Date of Patent: Mar. 1, 1994

[54] MECHANISM FOR LOADING AND UNLOADING A CASSETTE TAPE

[75] Inventor: Tsuyoshi Nagasawa, Tokyo, Japan

[73] Assignee: Sony Corporation, Tokyo, Japan

[21] Appl. No.: 848,723

[22] Filed: Mar. 9, 1992

[30] Foreign Application Priority Data

Mar. 13, 1991 [JP] Japan .................. 3-072160

[51] Int. Cl.⁵ .................. G11B 15/665; G11B 15/675
[52] U.S. Cl. ........................ 360/85; 360/95; 360/96.5; 360/96.6
[58] Field of Search ............ 360/85, 95, 96.5, 96.6

[56] References Cited

U.S. PATENT DOCUMENTS

| | | | |
|---|---|---|---|
| 4,918,551 | 4/1990 | Yoshida et al. | 360/85 X |
| 4,949,203 | 8/1990 | Kunimaru et al. | 360/85 |
| 5,038,236 | 8/1991 | Nakahara | 360/96.5 |
| 5,124,854 | 6/1992 | Iyota et al. | 360/96.6 |
| 5,191,493 | 3/1993 | Tamura | 360/85 X |

FOREIGN PATENT DOCUMENTS

| | | |
|---|---|---|
| 0308172 | 3/1989 | European Pat. Off. |
| 0375672 | 6/1990 | European Pat. Off. |
| 0394975 | 10/1990 | European Pat. Off. |
| 0431620 | 6/1991 | European Pat. Off. |
| 0449658 | 10/1991 | European Pat. Off. |
| 2200239 | 7/1988 | United Kingdom . |
| 2202987 | 10/1988 | United Kingdom . |
| 2211980 | 7/1989 | United Kingdom . |

Primary Examiner—John H. Wolff
Attorney, Agent, or Firm—Lewis H. Eslinger; Jay H. Maioli

[57] ABSTRACT

A tape unit includes:

a cassette mount section for detachably mounting a tape cassette therein, the cassette mount section having at least two reel bases for engagement respectively with two tape reels of the tape cassette mounted; a cover movably supported on a chassis, the cover being movable between an open position for opening the cassette mount section and a closed position for closing the cassette mount section; a cassette holder movably supported on the chassis, the cassette holder being movable between an ejection position for insertion and removal of the tape cassette and a cassette mounting position for mounting the tape cassette in the cassette mount section; a tape-loading device for drawing a portion of tape out of the tape cassette mounted in the cassette mount section and causing the tape portion to pass through a predetermined tape path; and a link device for linking the cassette holder and the tape-loading device to the cover, the linkage being such that during movement of the cover from the open position toward the closed position, a first forward movement of the cover from the open position toward the closed position moves the cassette holder to mount the tape cassette into the cassette mount section, and a further forward movement of the cover subsequent to the first movement operates the tape-loading device to perform tape loading.

7 Claims, 34 Drawing Sheets

FIG. 1

MECHANISM FOR LOADING AND UNLOADING A CASSETTE TAPE

BACKGROUND OF THE INVENTION (1) Field of the Invention

This invention relates to a tape unit which has a head drum provided with a rotary magnetic head or heads, in which recording or reading of signals on a tape is carried out in the condition where a portion of the tape drawn out of a tape cassette mounted in a cassette mount section is wrapped around the head drum and in which the tape cassette is mounted into and removed from the cassette mount section through a cassette holder turnably supported on a chassis. More particularly, this invention relates to a tape unit of the above type which enables drive means, control means, various detection switches and the like for tape loading and tape unloading to be omitted, with the result of a marked reduction in cost and a more compact configuration, and which permits recording or reproduction (playback) to be started immediately after completion of an operation for closing an opening side of the cassette mount section.

(2) Description of the Prior Art

There have been known tape units in which a tape cassette is fitted into and removed from a cassette mount section through the function of a cassette holder, in the manner as follows. The cassette holder, in which the tape cassette is removably loaded, is coupled to a cover for closing and opening an opening side of the cassette mount section so that the cassette holder can be moved together with the cover. When the cover is moved to an open position for opening the opening side of the mount section, the cassette holder is moved to an ejection position, namely, a position for insertion and ejection of a tape cassette. When the cover is moved to a closed position for closing the opening side, on the other hand, the cassette holder is moved to a cassette mounting position, namely, a position for mounting the inserted tape cassette into the cassette mount section.

There have also been known rotary head type tape units, such as video tape recorders and rotary head digital audio taperecorders (R-DAT), in which recording or reading of signals on a tape is carried out by drawing out a predetermined length of tape from a tape cassette mounted in a cassette mount section, wrapping a portion of the drawn-out length of tape around an outer peripheral surface of a head drum comprising a rotary magnetic head or heads, and feeding the tape in the thus wrapped condition while rotating the magnetic head or heads.

During a tape loading operation for drawing out a predetermined length of tape from the tape cassette and during a tape unloading operation for taking up the drawn-out portion of tape onto one of the tape reels in the tape cassette, in use of the tape unit of the above type, rotation of the other tape reel is prevented by a lock means. In this condition, a reel base drive means for selective rotation in a tape takeup direction of two reel bases in engagement respectively with the two tape reels is located in a neutral position for non-linkage with any of the reel bases, and is prevented by a restricting means from moving in a direction for linkage. By these arrangements, the tape loading and unloading operations can be achieved smoothly, without slacking of the tape and without any excessive load on the reel bases. Further, the locking of the reel base and the position control over the reel base drive means are canceled substantially simultaneously with the completion of the tape loading so that no trouble occurs in tape feeding.

In the tape units of this type, the tape unloading operation is so scheduled that the movement of the cassette holder to the ejection position is enabled after the tape portion drawn out of the tape cassette is completely taken up onto one of the tape reels.

Therefore, the above type of tape unit requires a number of components, in addition to a mechanism for mounting and removing a tape cassette from the cassette mount section, a tape feeding means, a rotary head or heads for recording or playback, etc. One of the additionally required components is a tape loading mechanism which performs a tape loading operation, i.e. an operation of drawing out a portion of tape from a tape cassette, wrapping the tape portion around the head drum and passing the tape portion along a predetermined tape path, and a tape unloading operation. Another component needed is a drive means for moving a movable member of the tape loading mechanism which is moved between a position inside the tape cassette fitted in the cassette mount section and a position external to the tape cassette, to thereby serve for drawing out a portion of tape and for other functions. Besides, because a certain degree of strong force is necessary for tape loading, the drive means generally should be provided with a speed reduction mechanism composed of a gearing system, for obtaining an increased torque, in addition to a motor provided as a drive source. Furthermore, in order to prevent malfunction or to ensure automatic starting of a tape loading operation upon mounting of the tape cassette in position, the tape unit of this type needs a variety of sensors for detecting completion of the mounting of a tape cassette into the cassette mount section, completion of the tape loading, etc.

Moreover, due to the presence of the speed reduction mechanism provided for the drive means for the tape loading mechanism, as mentioned above, it requires some time to complete the tape loading or tape unloading operation. Accordingly, there must be a certain waiting time before recording or playback can be started after the movement of the cover to the closed position, or before the cover can be moved to the open position after recording or playback is finished.

SUMMARY OF THE INVENTION

It is accordingly a first object of this invention to provide a tape unit which has a reduced number of component parts for tape loading and tape unloading operations, with the resultant lower cost and smaller size, and which enables a recording or playback operation to be started immediately upon completion of an operation for closing an opening side of a cassette mount section.

It is a second object of this invention to provide a tape unit in which a cover can be moved to an open position immediately upon completion of recording or playback and which enables swift insertion and ejection of a tape cassette.

In order to attain the above objects, this invention provides a tape unit including:

a cassette mount section for detachably mounting a tape cassette therein, and having at least two reel bases for engagement respectively with two tape reels of the tape cassette mounted;

a cover movably supported on a chassis and cover being movable between an open position for opening the cassette mount section and a closed position for closing the said cassette mount section;

a cassette holder movably supported on the chassis and being movable between an ejection position for insertion and removal of the tape cassette and a cassette mounting position for mounting the tape cassette in the cassette mount section;

tape-loading means for drawing a portion of tape out of the tape cassette mounted in the cassette mount section and causing the tape portion to pass through a predetermined tape path; and link means for linking the cassette holder and the tape-loading means to the cover, the linkage being such that during movement of the cover from the open position toward the closed position, a first forward movement of the cover from the open position toward the closed position moves the cassette holder to mount the tape cassette into the cassette mount section, and a further forward movement of the cover subsequent to the first movement operates the tape-loading means to perform tape loading. The present invention further includes tape takeup means capable of being releasably linked to one of the tape reels of a tape cassette and rotating the tape reel in a tape takeup direction to thereby take up a tape drawn out of the tape cassette, wherein the tape-loading means is adapted for a change between a tape loading end condition where the tape portion drawn out of the tape cassette mounted in the cassette mount section has been passed through the predetermined tape path and an initial condition where the tape portion is not yet drawn out, and the said link means links the cassette holder, the tape takeup means and the tape-loading means to the cover, the linkage being such that during movement of the cover from the closed position toward the open position, a first movement of the said cover from the closed position toward the open position brings the tape-loading means into the initial condition and causes the said tape takeup means to perform a tape takeup action, and a further movement of the cover subsequent to the first movement moves the cassette holder to the ejection position. The tape unit further comprises means for taking up a tape, the tape takeup means capable of being releasably linked to one of the tape reels of a tape cassette and rotating the tape reel in a tape takeup direction to thereby take up the tape portion drawn out of the tape cassette, wherein the tape-loading means is adapted for a change between a tape loading end condition where the tape portion drawn out of the tape cassette mounted in the cassette mount section has been passed through the predetermined tape path and an initial condition where the tape portion is not yet drawn out, and the link means links the cassette holder, the tape takeup means and the tape-loading means to the cover, the linkage being such that during movement of the said cover from the open position toward the closed position, a first forward movement of the cover from the open position toward the closed position moves the cassette holder to a cassette mounting position, and a further forward movement of the cover subsequent to the first movement operates the tape-loading means to perform tape loading, the tape takeup means being released from one of the reel bases at least upon completion of the tape loading, and that during movement of the cover from the closed position toward the open position, a first backward movement of the cover from the closed position toward the open position causes the tape takeup means to make linkage with one of the reel bases so as to perform a tape takeup action, and returns the tape-lading means into the initial condition, and a further backward movement of the cover subsequent to the first movement from the closed position toward the open position causes the cassette holder to be moved to the ejection position.

The tape unit according to the present invention additionally includes means for driving the reel bases movable between three positions, the three positions including two positions for selective linkage with either of the two reel bases, and a neutral position for non-linkage with any of the reel bases;

restrictor means movable between a restriction position for restricting the movement of the reel base drive means and a restriction cancel position for canceling the restriction; and lock means movable between a lock position for preventing the rotation of one of the reel bases and a lock cancel position for permitting the rotation, wherein the movement of the cover from the open position toward the closed position causes the link means to move movable members of the tape-loading means, whereby tape loading is performed, the restrictor means and the lock means being maintained respectively in the restriction position and the lock position while the tape loading is performed by the tape-loading means, and the restrition means and the lock means being moved respectively into the restriction cancel position and the lock cancel position substantially simultaneously with completion of the tape loading.

The reel base drive means of the present invention includes an oscillating arm which receives a rotational drive force transmitted from a motor and is capable of oscillating between the two reel bases according to the rotating direction of the motor, the oscillating arm supporting an oscillation gear at one end thereof, the oscillation gear capable of rotating in forward and reverse directions, and the restrictor means and the lock means are arranged as a single compound lock lever, the compound lock lever capable of engaging with the oscillating arm to restrict the oscillation of the oscillating arm and to lock the oscillating arm in the neutral position for non-linkage with any of the two reel bases, the compound lock lever capable of engaging with one of the reel bases to prevent the rotation of the reel base, wherein a movement of the cover from the open position toward the closed position causes the link means to move the compound lock lever, thereby canceling the locked condition.

A tape unit according to the present invention also includes:

a cassette mount section for detachably mounting a tape cassette therein, the cassette mount section having at least two reel bases for engagement respectively with two tape reels of the tape cassette mounted;

a cover movably supported on a chassis, the cover being movable between an open position for opening the cassette mount section and a closed position for closing said cassette mount section;

a cassette holder movably supported on the chassis, the cassette holder being movable between an ejection position for insertion and removal of the tape cassette and a cassette mounting position for mounting the tape cassette in the cassette mount section;

a tape-loading means adapted for a change between a tape loading end condition where a portion of tape drawn out of the tape cassette mounted in the cassette mount section has been passed through the predetermined tape path and an initial condition where the tape portion is not yet drawn out;

tape takeup means capable of being releasably linked to one of tape reels of the the tape cassette and rotating the tape reel in a tape takeup direction to thereby take up a tape portion drawn out of the tape cassette; and a link means for linking the cassette holder, the tape takeup means and the tape-loading means to the cover, the linkage being such that during movement of the cover from the closed position toward the open position, a first movement of the cover from the closed position toward the open position brings the tape-loading means into the initial condition and causes the tape takeup means to perform a tape takeup action, and a further movement of the cover subsequent to the first movement moves the cassette holder to the ejection position.

The tape unit further comprises elastic means for urging the tape-loading means in a direction for returning from the tape loading end condition where the tape portion drawn out of the tape cassette mounted in the cassette mount section has been passed through the predetermined tape path and the initial condition where the tape portion is not yet drawn out.

In the tape unit according to this invention, the tape loading and tape unloading operations can be carried out with a smaller number of component parts, as compared with those in the prior art tape units, and recording or playback of signals on a magnetic tape can be started immediately upon completion of the operation of closing the opening side of a cassette mount section with a cover.

Moreover, in the tape unit of this invention, the cover can be moved to its open position immediately upon completion of recording or playback, and insertion or ejection of a tape cassette can be carried out swiftly.

Furthermore, these features of the tape unit according to this invention promise a simpler construction and marked reductions in size and cost.

The above and other objects, features and advantages of this invention will become apparent from the following detailed description and the appended claims, taken in conjunction with the accompanying drawings.

BRIEF DESCRIPTION OF THE DRAWINGS

FIG. 1 is a plan view showing an R-DAT (in whole except a casing) according to this invention;

DESCRIPTION OF PREFERRED EMBODIMENTS

The tape unit of this invention will now be explained in detail below with reference to some embodiments thereof illustrated in the attached drawings.

The embodiments shown demonstrate an application of this invention to a rotary head digital audio tape unit (hereinafter referred to simply as "R-DAT") 1.

Figure 13:
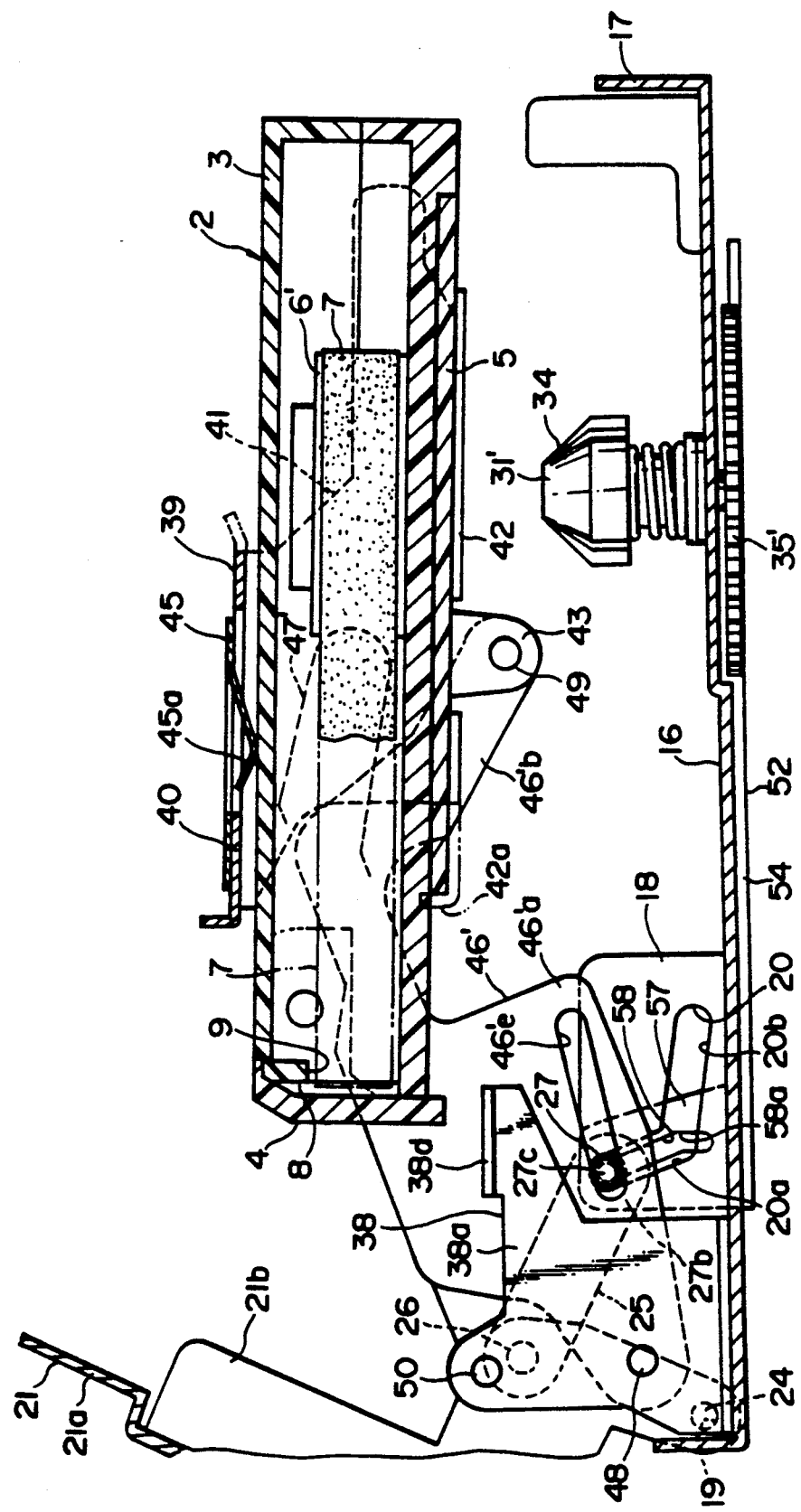
FIG. 13 is an enlarged sectional view taken along line XIII—XIII of FIG. 1, showing the condition where a tape cassette is mounted in the cassette holder which is located in its ejection position.

First, a tape cassette 2 (see FIGS. 13, 14 and 34) for use with the R-DAT 1 will be explained.

The tape cassette 2 comprises a comparatively thin boxlike cassette case 3 which is roughly rectangular as viewed in cross section, a front cover 4 and a shutter 5 which are supported by the cassette case 3, two tape reels 6 and 6' contained within the case 3, and a magnetic tape 7 wound around the reels 6 and 6'.

A front face 8 constituting one side face of the cassette case 3 serves as a tape lead-out surface. The tape lead-out surface 8 is provided with tape outlets 9 and 9 at both end portions thereof. Between the two tape outlets 9 and 9 is provided a laterally elongate tape lead-out recess 10, which is open on the upper and lower sides.

Substantially cylindrical internal tape guides 11 and 11 are provided at positions deviated from the tape outlets 9 and 9 to the side of the tape lead-out recess 10.

Figure 34:
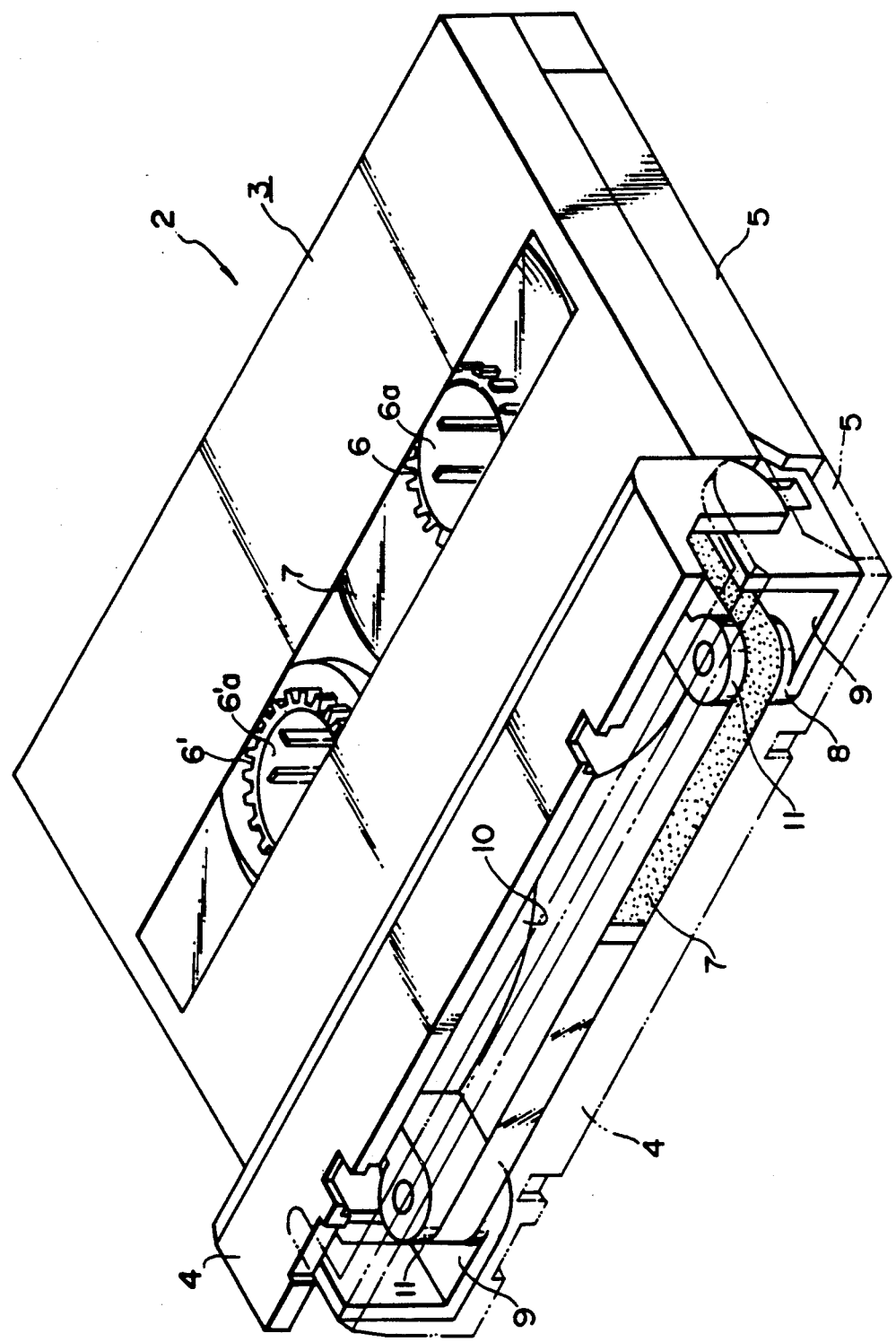
FIG. 34 is a perspective view of one exemplary tape cassette to be used with the R-DAT of the present invention.

The front cover 4 is turnably supported on a front end portion of the cassette case 3 so as to be movable between a closed position for closing the tape lead-out surface 8, as indicated by two-dotted chain lines in FIG. 34, and an open position for opening the tape lead-out surface 8, as indicated by solid lines in FIG. 34. The front cover 4 is normally urged toward the closed position by a turning force which is exerted by an elastic means (not shown), and is moved to the open position when the tape cassette 2 is mounted into a cassette mount section (described later) of the DAT 1.

The two tape reels 6 and 6' are rotatably contained in the cassette case 3 and are spaced sideways from each other. The tape reels 6 and 6' have reel base engaging holes 6a, 6a' bored axially through central portions thereof.

The magnetic tape 7 is attached to the outer peripheral surfaces of the two tape reels 6 and 6' respectively at both ends thereof, and consists of a predetermined length of magnetic tape wrapped around one or both of the reels 6 and 6'. Before tape loading is carried out, the magnetic tape 7 begins at one of the tape reels, 6, the supply reel (hereinafter referred to simply as "S-reel"), then wrapped around one of the internal tape guides 11, led out of the cassette case 3 through one of the tape outlets 9, extending therefrom along the tape lead-out surface 8, wrapped around the other internal tape guide 11, and led again into the cassette case 3 through the other tape outlet 9, to be taken up around the other tape reel 6', namely, the take-up reel (hereinafter referred to simply as "T-reel").

Figure 14:
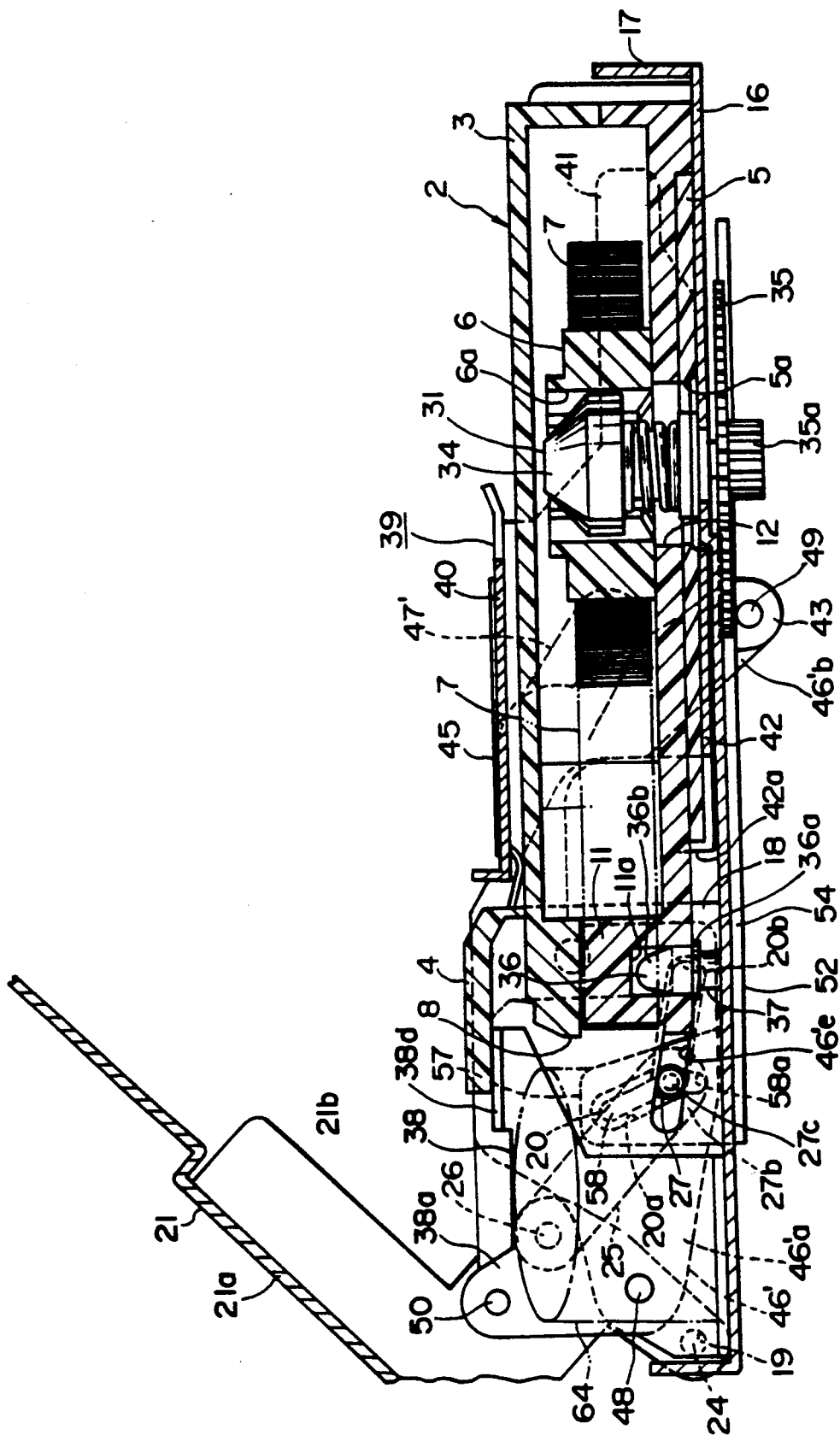
FIG. 14 is an enlarged sectional view taken along line XIV—XIV of FIG. 1, showing the condition where the cassette holder with a tape cassette mounted therein has been moved to the cassette mounting position.
Figure 15:
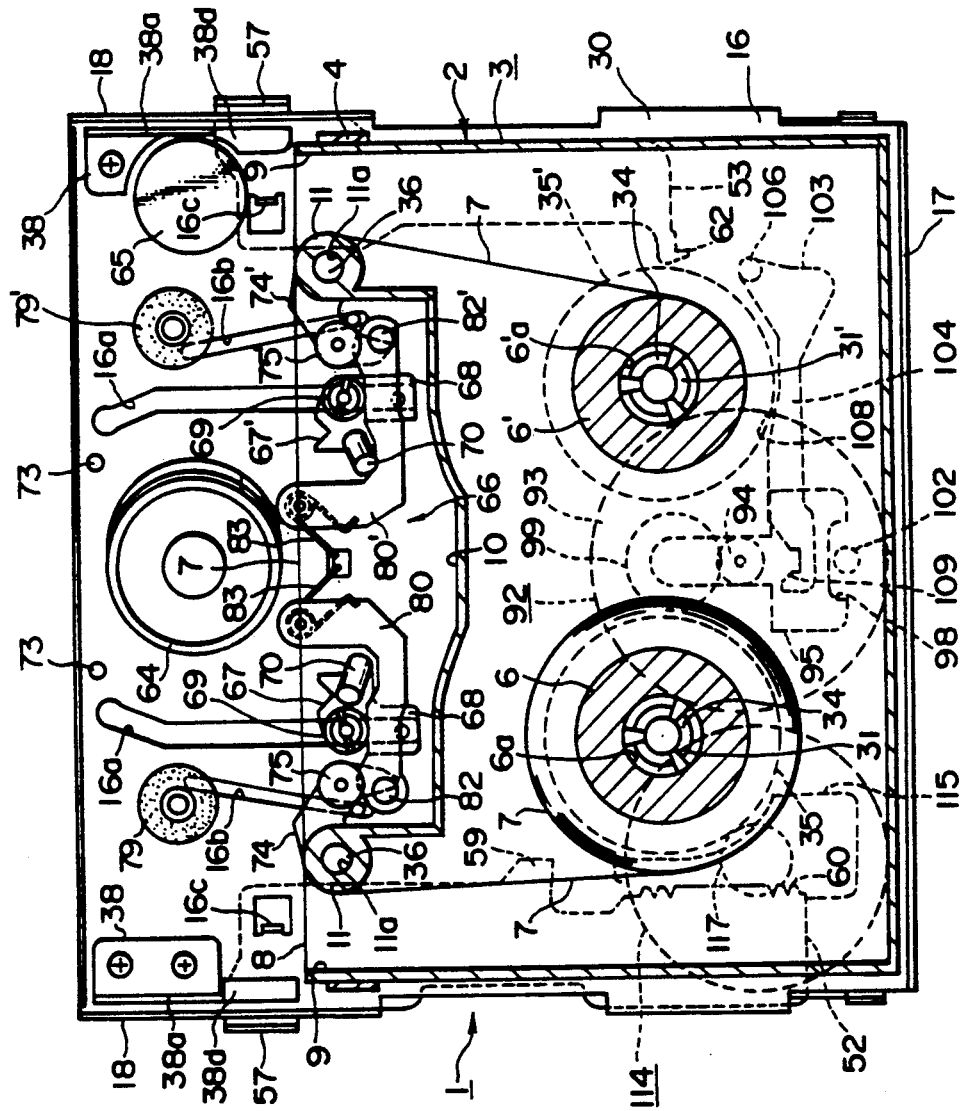
FIG. 15 is a plan view showing an R-DAT in which the tape cassette, shown in section, is mounted.

A bottom plate of the cassette case 3 is provided with reel base insertion holes 12 and 12 (only one of which is shown in FIG. 14) at positions corresponding respectively to the tape reels 6 and 6'. The shutter 5 also is provided with similar two reel base insertion holes 5a and 5a (again, only one of the two insertion holes is shown in FIG. 14).

The shutter 5 is supported to be movable forward and backward within predetermined limits, in overlapping relationship with the bottom surface of the cassette case 3, and is urged toward the front side of the cassette case 3 by an elastic means (not shown). When the tape cassette 2 is not inserted in a cassette holder (which will be described later) of the R-DAT 1, the shutter 5 is maintained in the closed position where the reel base insertion holes 5a and 5a thereof are out of register with the reel base insertion holes 12 and 12 of the cassette case 3, that is, the position indicated by two-dotted chain lines in FIG. 34. Therefore, the reel base insertion holes 12 and 12 of the cassette case 3 are closed by the shutter 5. When the tape cassette 2 is inserted into the cassette holder (described later), the shutter 5 is moved to the open position where the reel base insertion holes 5a and 5a thereof are in register with the reel base insertion holes 12 and 12 of the cassette case 3 (see FIG. 14).

Denoted by 11a and 11a are positioning holes (only one of which is shown in FIG. 14) formed in shaft center portions of the internal tape guides 11 and 11 and opened to the bottom side of the cassette case 3.

Next, each part of the R-DAT will be explained.

A casing 13 (see FIGS. 4 to 6) of the R-DAT 1 comprises a casing main portion 14 opened on the upper side and a comparatively thin cover 15 opened on the lower side.

Figure 1:
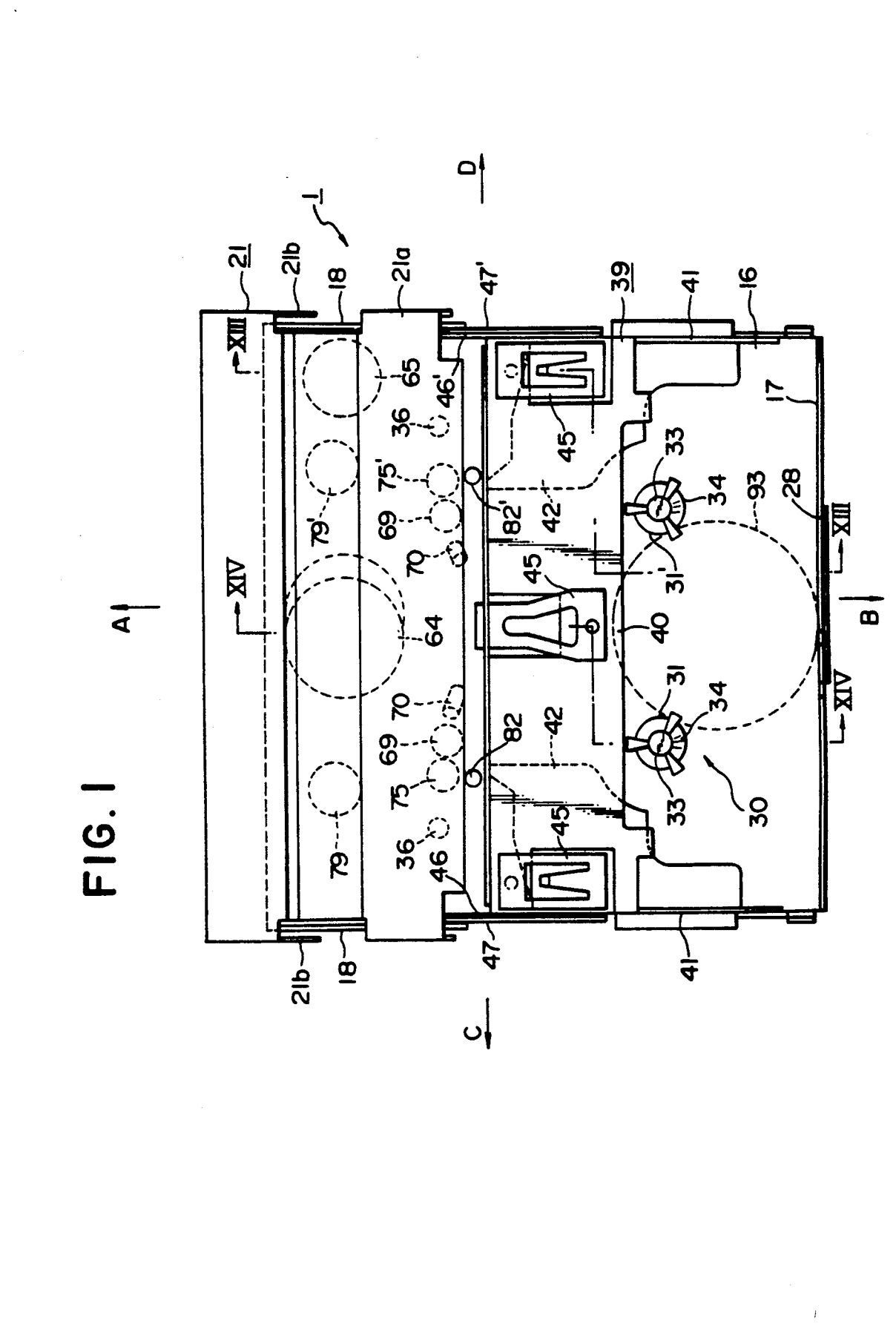

A chassis 16 for mechanical parts is disposed horizontally near the top of the interior of the casing main portion 14, and has a main portion in a roughly square, flat platelike shape slightly smaller than the plan-view shape of the casing 13. A rear end portion of the chassis 16 is formed to be slightly above the rest of the chassis 16 (Here and in the following descriptions, the direction of arrow A in FIG. 1 is taken as forward, the direction of arrow B as rearward or backward, the direction of arrow C as leftward, and the direction of arrow D as rightward.). The main portion of the chassis 16 is integrally formed with a rear wall 17 projected upward from the rear edge of the chassis 16, support walls 18 and 18 projected upward from both side edges of the chassis 16, and extended along about one-third of the front-rear extent of the chassis 16 from the front end of the chassis 16.

The support walls 18 and 18 are provided with threaded holes 19, 19 in front end portions thereof, and provided in rear half portions thereof with guide slots 20 and 20 for guiding the passage of link pins (which will be described below). The guide slots 20 and 20 each comprise a first guide portion 20a, 20a extending straight with a steep downward gradient, and a second guide portion 20b, 20b extending straight with a slow downward gradient from the lower end of the first guide portion 20a, 20a.

Other parts of the chassis 16 will be described later.

The cover 15 comprises a cover base 21 turnably supported on a front end portion of the chassis 16, and a decorative panel 22 fitted to the cover base 21 so as to conceal the base 21. The cover base 21 comprises a top plate 21a substantially flat platelike in shape and roughly equal to the chassis 16 in size, arms 21b and 21b projected downward from front end portions of both side edges of the top plate 21a and having a roughly crank-like shape as viewed sideways, a small-height rear wall 21c projected downward from the rear edge of the top plate 21a, which are integrally formed from sheet metal. The arms 21b and 21b are provided with insertion holes 21d and 21d at the lower front ends thereof. The rear wall 21c is provided with a relatively small engaging pin 23 (see FIG. 9) protruding from a substantially central portion of the inner surface thereof.

Denoted by 24 and 24 are stepped screws, of which cylindrical portions are passed through the insertion holes 21d and 21d bored in the arms 21b and 21b of the cover base 21, and threaded shaft portions are screwed into the threaded holes 19 and 19 of the chassis 16, whereby the cover base 21 is turnably supported at its front end portion on the support walls 18 and 18 of the chassis 16.

Link levers 25 and 25 are of flat platelike shape with a predetermined length. The link levers 25 and 25 are each provided with an insertion hole 25a, 25a at one end thereof. The link levers 25 and 25 are turnably supported on the arms 21b and 21b of the cover base 21 by shafts 26 and 26 passed through the insertion holes 25a and 25a of the levers 25 and 25 and through insertion holes 21e and 21e bored in lower rear end portions of the arms 21b and 21b of the cover base 21.

Comparatively short, substantially cylindrical link pins 27 and 27 are attached to the other end of each of the link levers 25 and 25, in the condition where a near-end portion of the link pin 27, 27 is passed through the other end portion of the link lever 25, 25 in the plate thickness direction. Portions 27a and 27a near the link levers 25 and 25 (the portions 27a and 27a are hereinafter referred to as "intermediate portions") are slightly greater in diameter than the remaining portions 27b and 27b protruding toward the outside of the link levers 25 and 25 (hereinafter referred to as "outside portions"). Those portions 27c and 27c of the link pins 27 and 27 which protrude to the inside of the link levers 25 and 25 (the portions 27c and 27c are hereinafter referred to as "inside portions") have a diameter between the diameter of the outside portions 27b and 27b and the diameter of the intermediate portions 27a and 27a.

The intermediate portions 27a and 27a of the link pins 27 and 27 are slidably engaged in the guide slots 20 and 20 of the support walls 18 and 18, so that the link pins 27 and 27 are moved along the guide slots 20 and 20.

Figure 4:
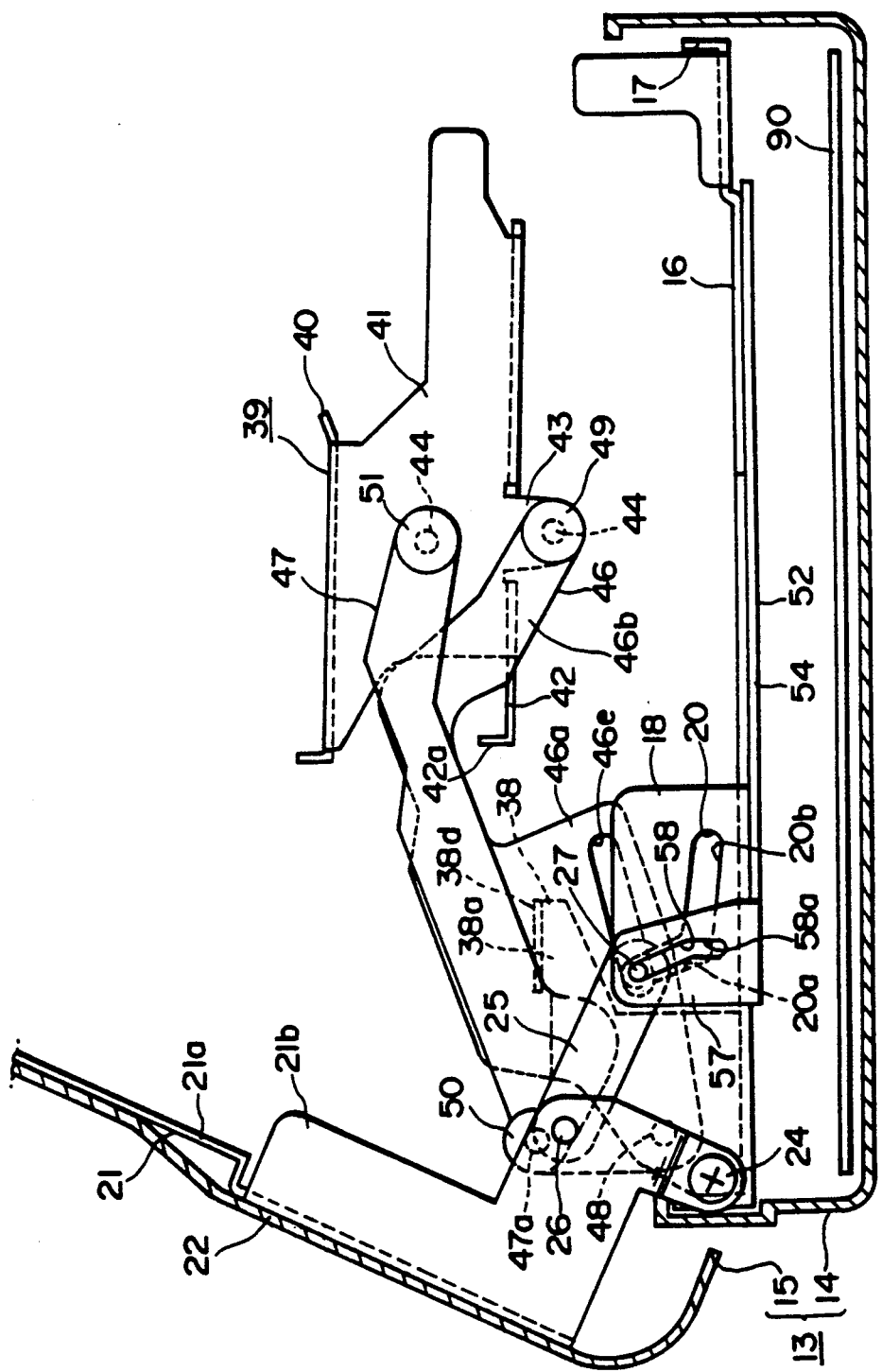
FIG. 4 is an enlarged side view of an R-DAT, with the casing cut away, in the condition where a cover is located in its open position.

When the cover 15 is opened, the link pins 27 and 27 are moved along the guide slots 20 and 20. When the link pins 27 and 27 each come to a position corresponding to the upper end of the guide slot 20, 20 as shown in FIG. 4 (the position hereinafter referred to as "raised position"), the link pins 27 and 27 are inhibited from further moving forward and upward. At this point, therefore, the cover 15 is prevented from moving counterclockwise as viewed in FIG. 4. In this condition, the cover 15 is in such a position as to be inclined, rear side up, at an angle of about 65° in relation to the upper surface of the chassis 16 (the position hereinafter referred to as "open position").

Figure 5:
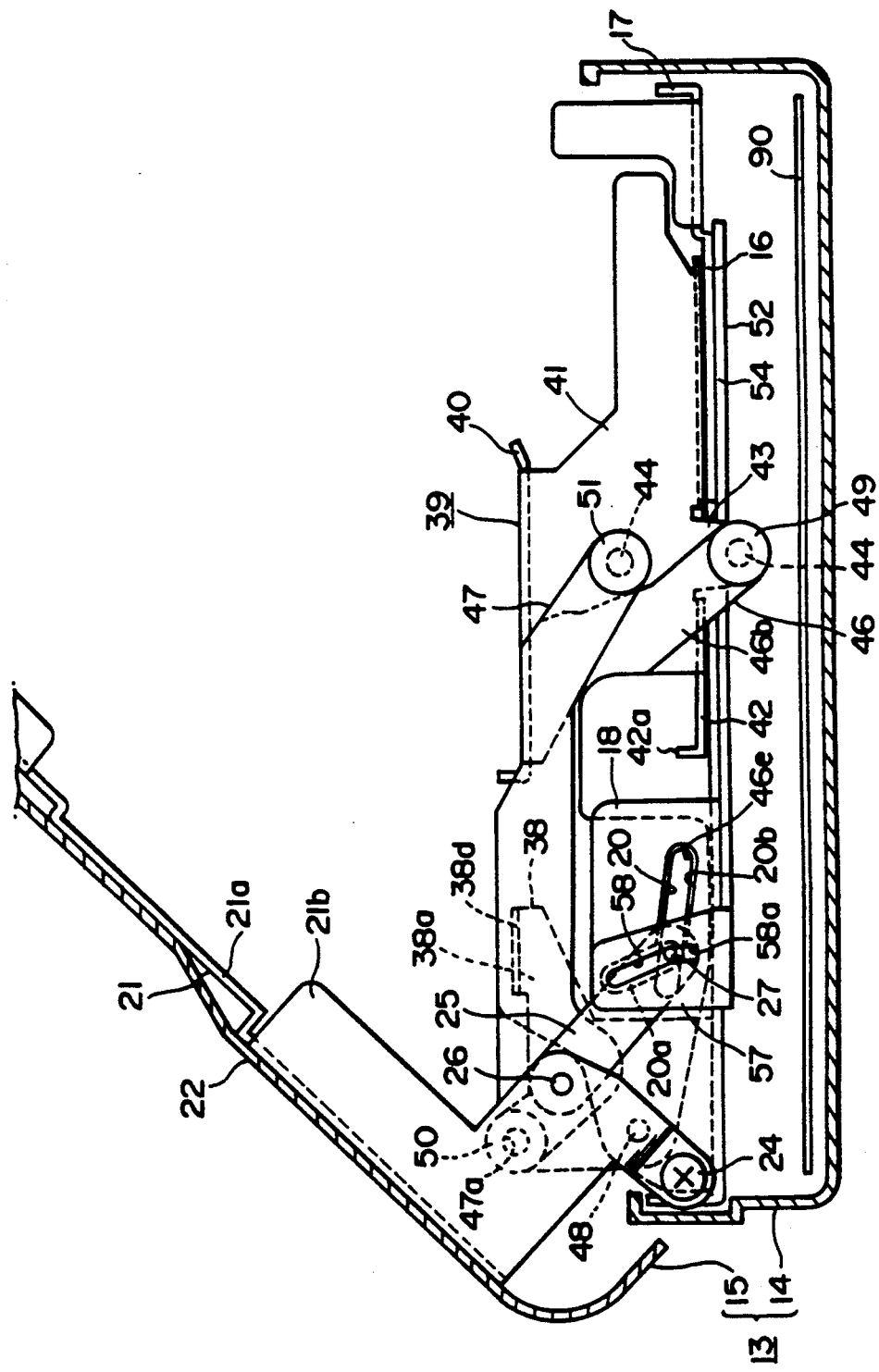
FIG. 5 is an enlarged side view of an R-DAT, with the casing cut away, in the condition where the cover is located in its half-open position and the cassette holder has reached a cassette mounting position.
Figure 6:
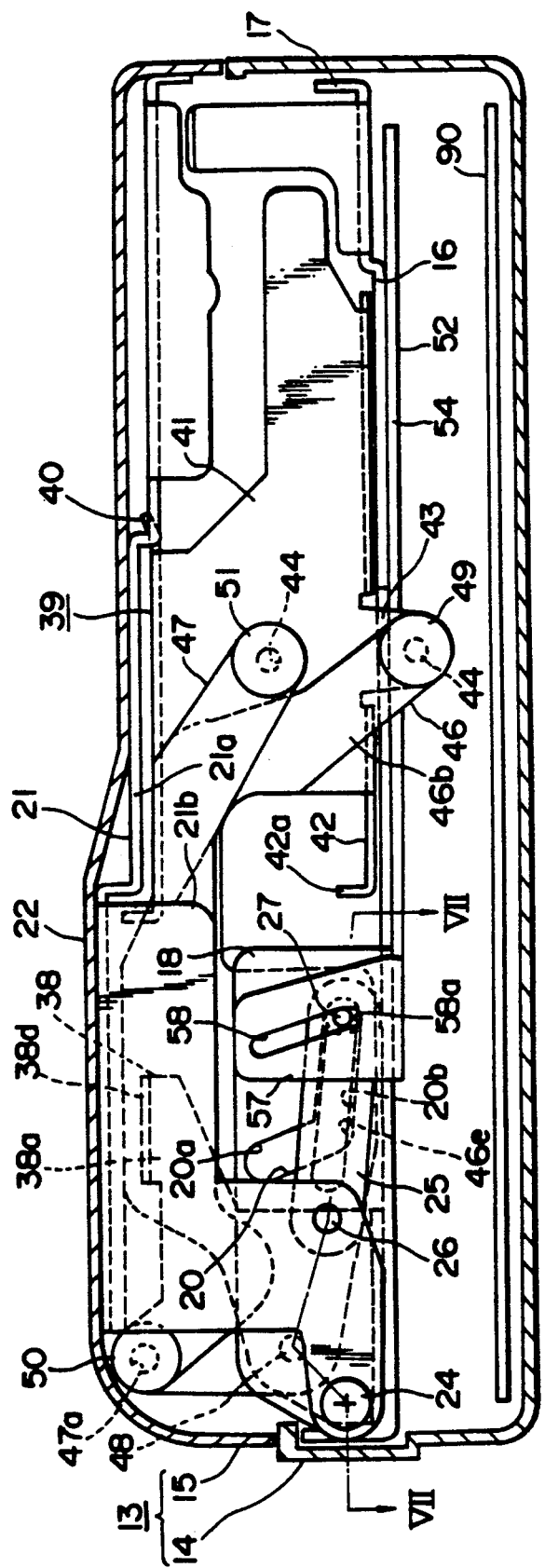
FIG. 6 is an enlarged side view of an R-DAT, with the casing cut away, in the condition where the cover is located in its closed position.
Figure 7:
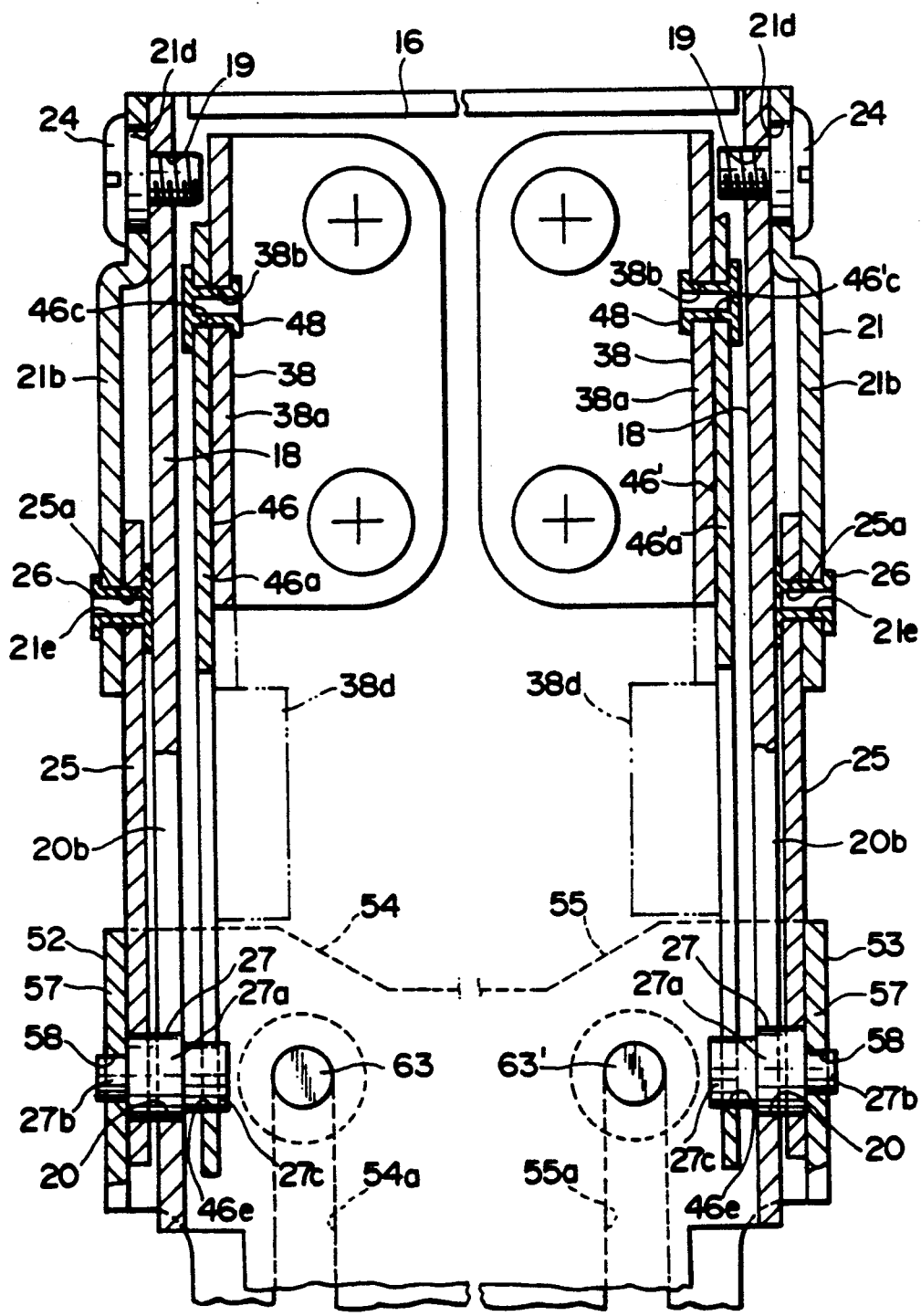
FIG. 7 is an enlarged sectional view of an embodiment of the present invention taken along line VII—VII of FIG. 6.

When the cover 15 is turned downward from the open position, the link pins 27 and 27 are first moved in a downward and slightly rearward direction along the first guide portions 20a and 20a of the guide slots 20 and 20. Then, after the link pins 27 and 27 each come to a position corresponding to the lower end of the first guide portion 20a, 20a as shown in FIG. 5 (the position hereinafter referred to as "lowered position"), the pins 27 and 27 are moved in a rearward and slightly downward direction along the second guide portions 20b and 20b. When the link pins 27 and 27 have each come to the position corresponding to the rear end of the second guide portion 20b, 20b as shown in FIG. 6 (the position hereinafter referred to as "retracted position"), the pins 27 and 27 are inhibited by the guide slots 20 and 20 from moving further backward.

Substantially at the same time with the arrival of the link pins 27 and 27 at the forward position, the cover 15 is set substantially horizontal to reach the closed position for closing the upper side of the casing main portion 14. In this condition, a rear end portion of the decorative panel 22 makes contact with a rear top surface of the casing main portion 14, whereby the cover 15 is prevented from turning further clockwise.

Thus, the cover 15 is moved between the open position and the closed position, the angular stroke of the turning movement being about 65°. The link pins 27 and 27 are shifted substantially vertically while the cover 15 is moved within a part of the stroke, namely, moved between the open position and a position at an angular distance therefrom of about 18° clockwise (hereinafter referred to as "half-open position"). On the other hand, the link pins 27 and 27 are shifted substantially forward or backward while the cover 15 is moved within the rest of the stroke, namely, moved between the half-open position and the closed position.

Figure 2:
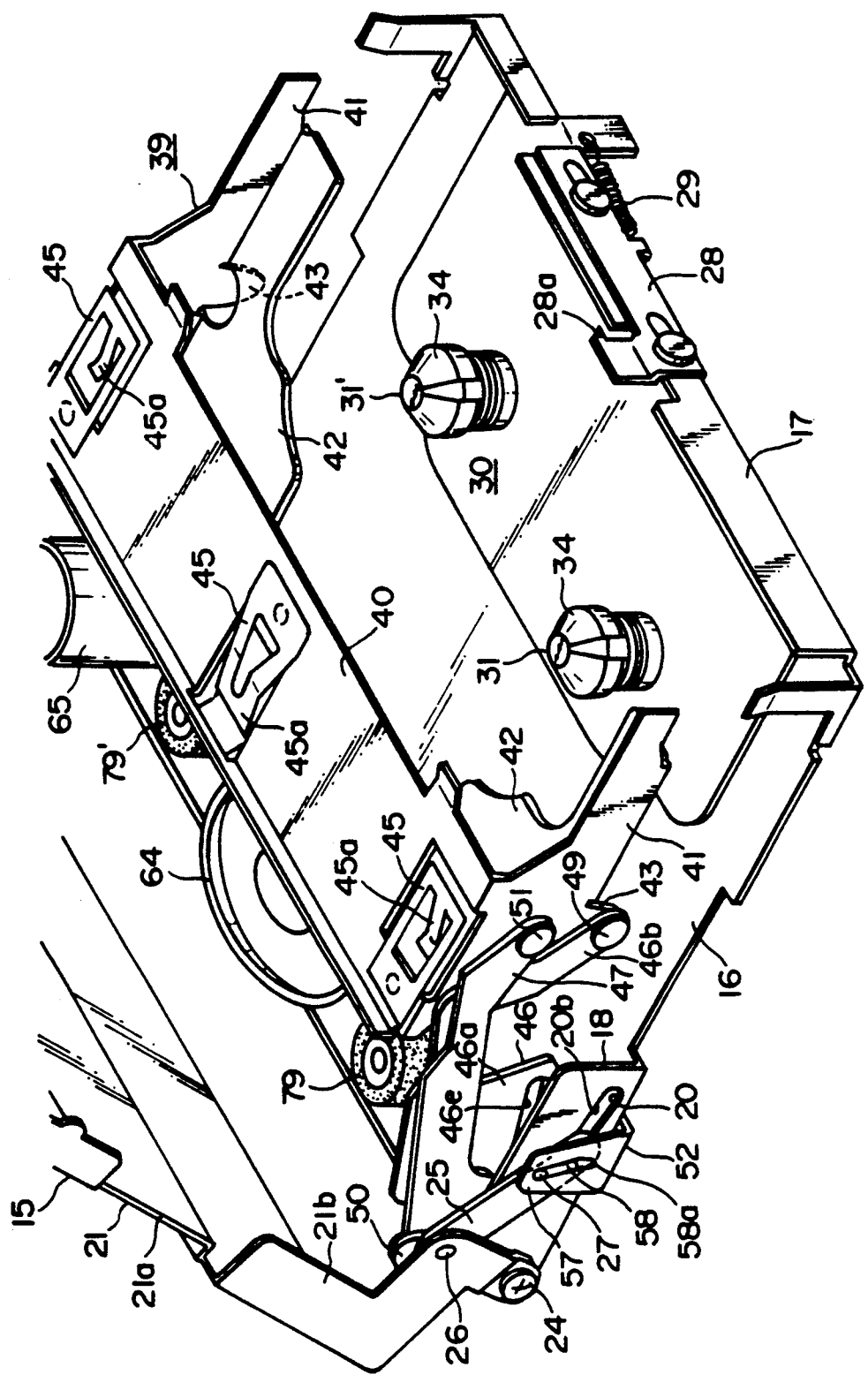
FIG. 2 is an enlarged perspective view showing substantially the whole of the R-DAT in the condition where a cassette holder is located in an ejection position.
Figure 9:
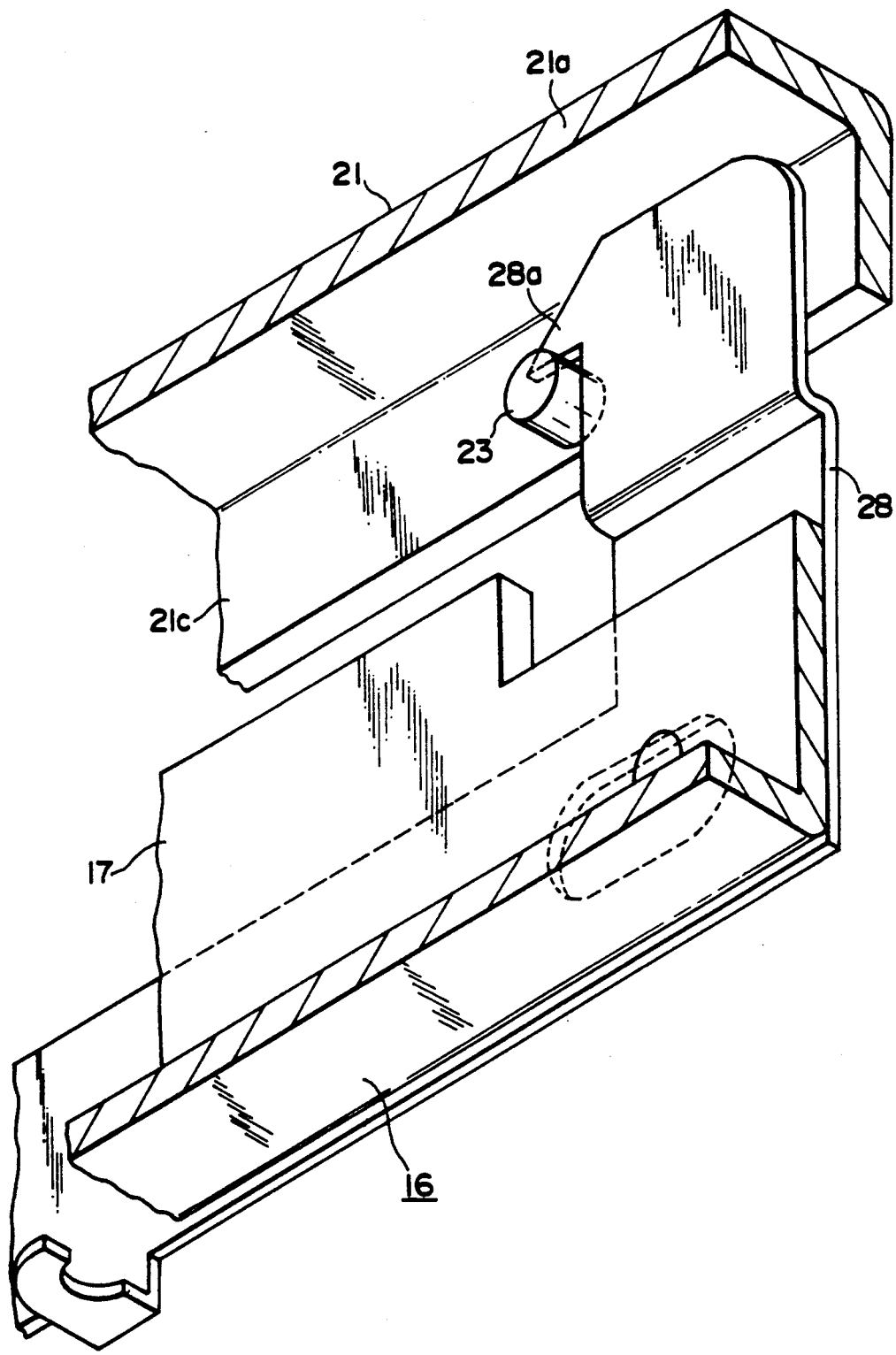
FIG. 9 is a partly cutaway, enlarged perspective view of a lock part for the cover of the present invention.
Figure 10:
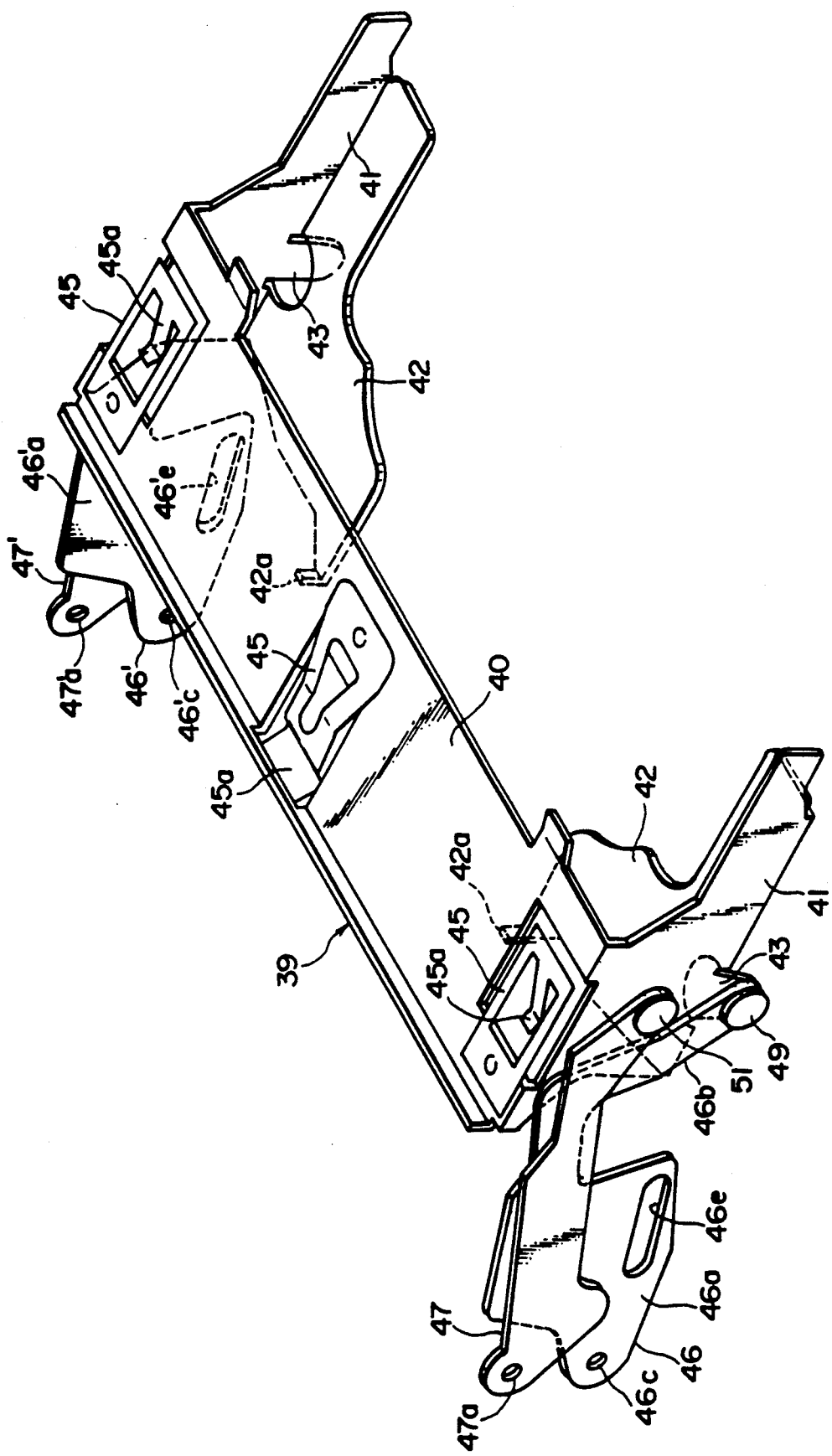
FIG. 10 is an enlarged perspective view of the cassette holder and support arms thereof.
Figure 11:
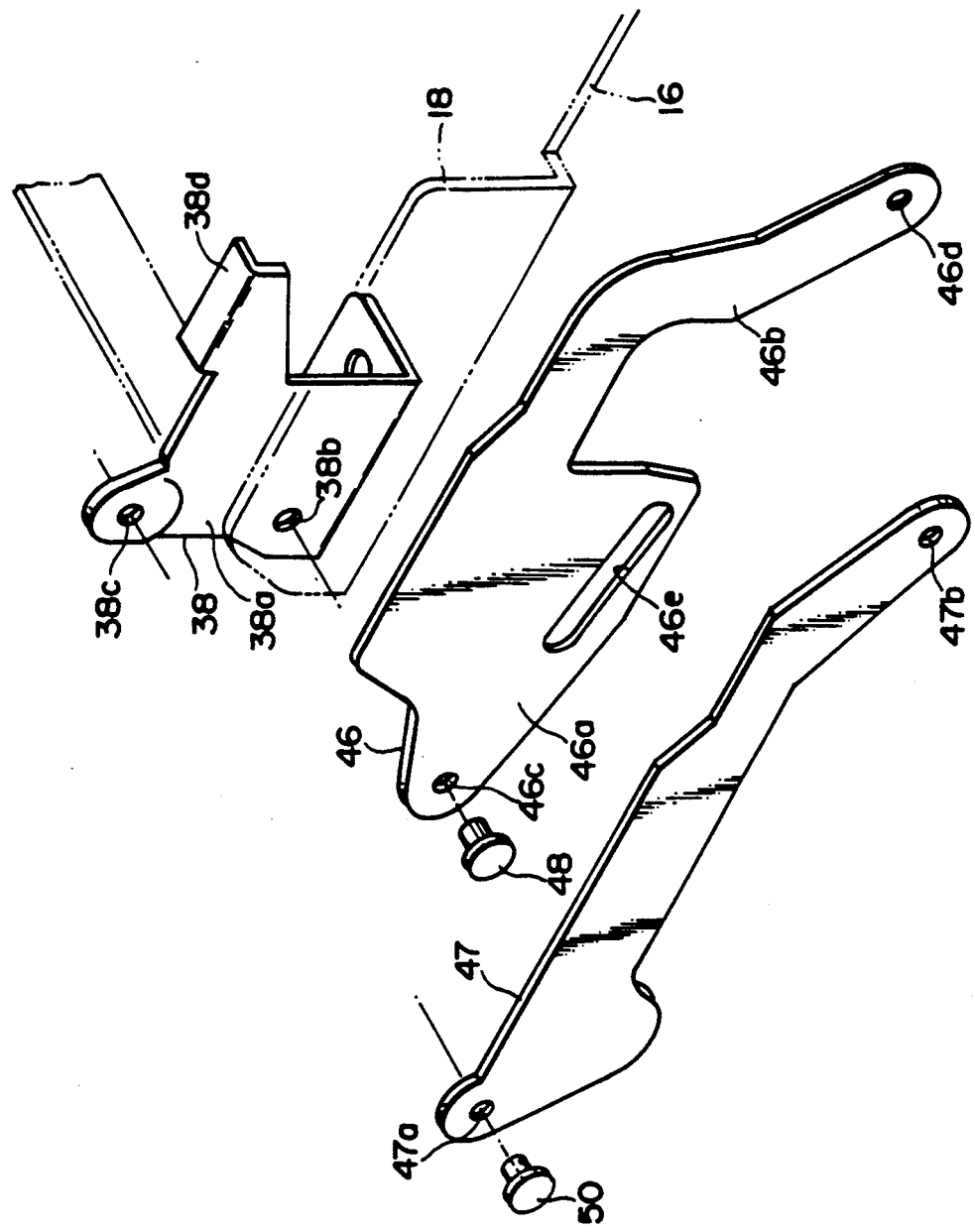
FIG. 11 is an enlarged, exploded perspective view of a support arm and a cover-raising member for the cassette holder.
Figure 12:
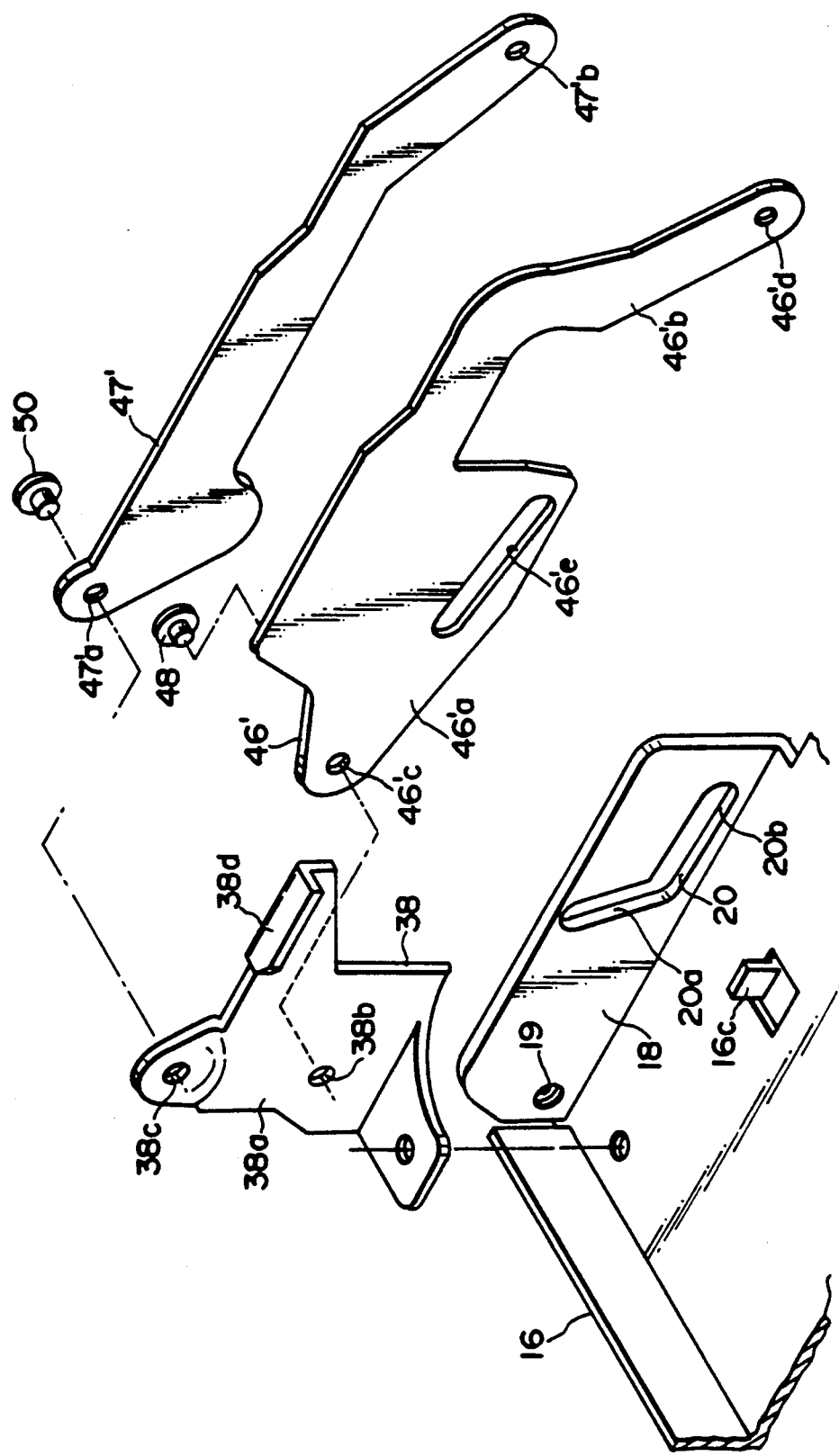
FIG. 12 is an enlarged, exploded view of portions of a support arm and a cover-raising member for the cassette holder.

Denoted by 28 is a cover lock lever, which is roughly L-shaped as viewed from the rear side (see FIGS. 2 and 9). The cover lock lever 28 is supported by the rear wall 17 of the chassis 16 so as to be movable in leftward and rightward directions within predetermined limits, and is urged in the direction of arrow D by a tension spring 29. The cover lock lever 28 is provided with an engaging claw 28a at the right end of an upper edge portion of its left end portion.

When the cover 15 comes to the closed position, the engaging pin 23 provided on the cover base 21 pushes the engaging claw 28a, whereby the cover lock lever 28 is once moved leftward. When the engaging pin 23 is moved to below the engaging claw 28a, the cover lock lever 28 is moved back rightward and the engaging claw 28a thereof is engaged with the engaging pin 23 from the upper side (see FIG. 9), whereby the cover 15 is locked in the closed position. The locked condition is released when the cover lock lever 28 is moved leftward.

While the cover 15 is moved between the open position and the half-open position, the cassette holder (described later) is moved in conjunction with the movement of the cover 15 from the open position toward the half-open position. While the cover 15 is moved between the half-open position and the closed position, position control over movable members of a tape loading mechanism, compound lock levers, takeup gears, etc. is performed in conjunction with the movement of the cover 15 from the half-open position to the closed position.

Denoted by 30 is a cassette mount section in which to removably mount a tape cassette 2. The cassette mount section 30 comprises a base constituted of the chassis 16, and two reel bases, two cassette-positioning pins, two cover-raising members, etc. supported on the chassis 16.

Reel bases 31 and 31' are disposed apart from each other sideways, at positions near the rear end of the chassis 16.

Figure 31:
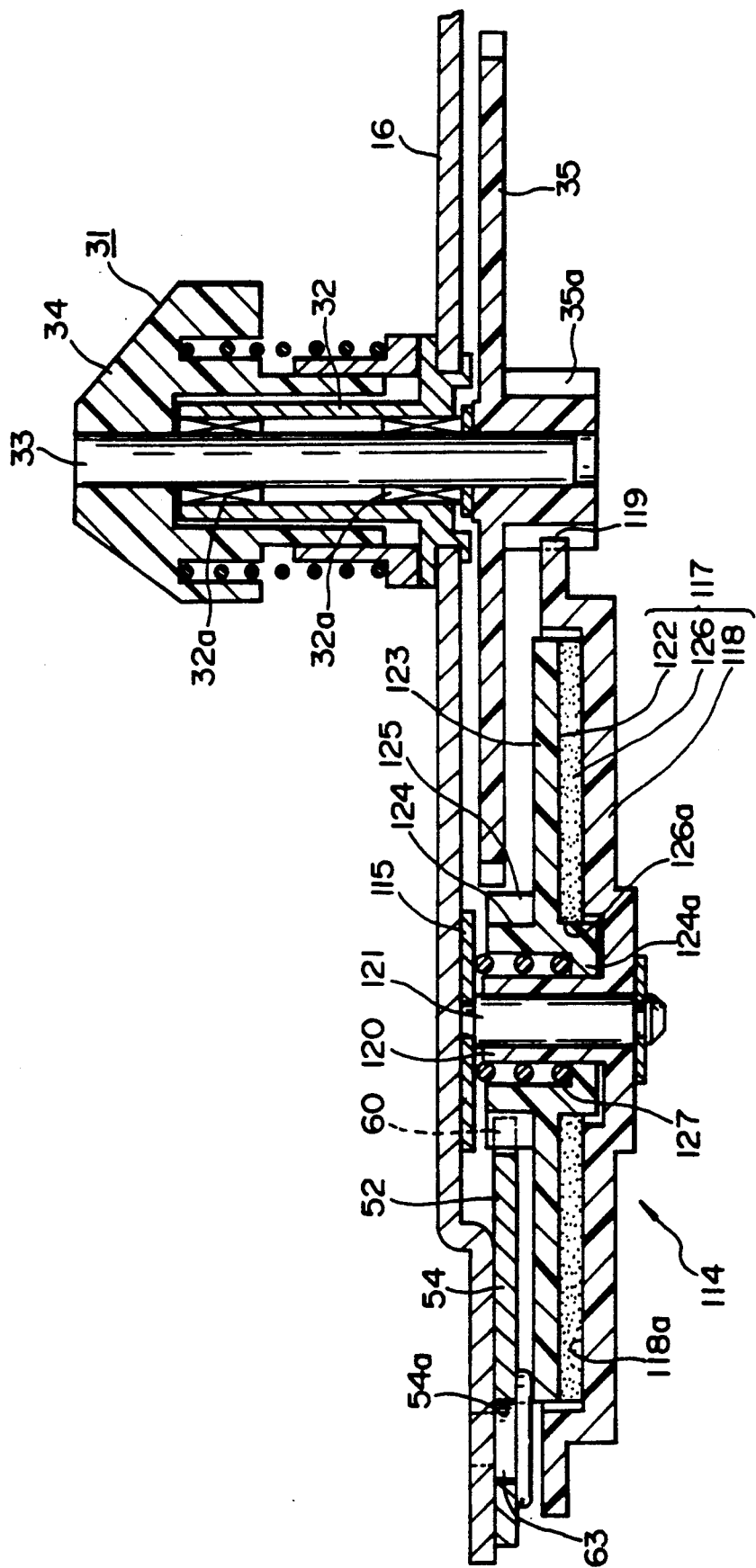
FIG. 31 is an enlarged, exploded perspective view of the tape takeup means.

Support cylinders 32 and 32 are erected on the chassis 16 (see FIG. 31, etc.), and rotating shafts 33 and 33 are rotatably supported on bearing members 32a and 32a-,—fitted in the support cylinders 32 and 32. Reel engaging shafts 34 and 34 are attached to those portions of the rotating shafts 33 and 33 which protrude above the support cylinders 32 and 32. On the other hand, center portions of input gears 35 and 35' (consisting of spur gears) are attached to those portions of the rotating shafts 33 and 33 which protrude below the support cylinders 32 and 32.

The input gear 35 for the left-side reel base 31 (hereinafter referred to as "S-side reel base") is integrally formed with a small gear 35a (see FIG. 31), which is projected from a central portion of the lower surface of the input gear 35.

Either one of these reel bases 31 and 31' is selectively rotated in a tape takeup direction by a reel base drive, as described later. As viewed from above, the tape takeup direction for the S-side reel base 31 is counterclockwise, and that for the right-side reel base 31' (hereinafter referred to as "T-side reel base") is clockwise.

Figure 22:
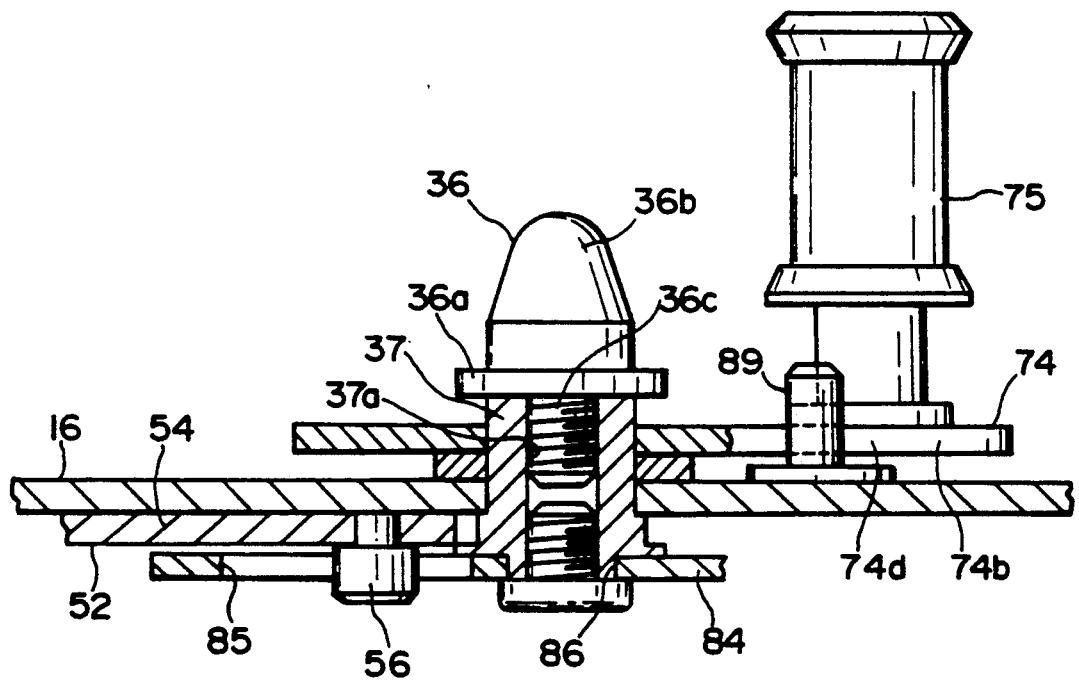
FIG. 22 is an enlarged, fragmentary sectional view taken along line XXII—XXII of FIG. 16.

Cassette-positioning pins 36 and 36 are provided with flanges 36a and 36a at intermediate portions with respect to the axial direction thereof. Of the cassette-positioning pins 36 and 36, those portions 36b and 36b above the flanges 36a and 36a are, for the most part, substantially in conical shape, and those portions 36c and 36c below the flanges 36a and 36a are formed as threaded shaft portions (see FIG. 22).

Support members 37 and 37 are attached to the chassis 16 in the manner of piercing the chassis 16, at positions each of which is near the front end of the chassis 16 and near a side end of the chassis 16. The support members 37 and 37 are substantially cylindrical in shape, with holes 37a and 37a therethrough being threaded holes.

The threaded shaft portions of 36c and 36c of the cassette-positioning pins 36 and 36 are screwed into upper half portions of the holes 37a and 37a of the support members 37 and 37, so that the pins 36 and 36 are set protruding above the chassis 16.

Denoted by 38 and 38 are cover-raising members attached to the upper side of the chassis 16, respectively at left and right ends of a front end portion of the chassis 16.

The cover-raising members 38 and 38 have wall portions 38a and 38a as major portions thereof. The wall portions 38a and 38a extend respectively in the direction of arrow A and the direction of arrow B of FIG. 1, and are provided with support holes 38b, 38b and 38c, 38c at positions slightly to the front lower side of central portions of the wall portions 38a and 38a and at front upper end portions of the wall portions 38a and 38a, respectively. Cover-raising pieces 38d and 38d, small in size in left-right directions, are projected inward from rear end portions of the top edges of the wall portions 38a and 38a.

The upper side of the casing main portion 14 is the opening side of the cassette mount section 30. Therefore, the opening side of the cassette mount section 30 is closed and opened, according to the position of the cover 15.

A cassette holder 39, for holding a tape cassette 2 and detachably mounting the cassette 2 into the cassette mount section 30, is supported on the chassis 16 so as to be capable of substantially vertical movements. The cassette holder 39 is moved in conjunction with the movement of the cover 15. The movement of the cassette holder 39 takes place between an ejection position, shown in FIG. 4, where insertion and removal of the tape cassette 2 are carried out, and a cassette mounting position, shown in FIGS. 5 and 6, where the tape cassette 2 is mounted in the cassette mount section 30.

The cassette holder 39 comprises: a top plate 40 which is elongate in left-right directions, namely, in the directions of arrows C and D FIG. 1; side plates 41 and 41 which protrude downward respectively from the left and right edges of the top plate 40 and extended rearwardly beyond the top plate 40; bottom plates 42 and 42 which are horizontally projected inwards from the side plates; and lugs 43 and 43 which are cut and bent from the bottom plates 42 and 42 to project downward from positions near the front ends of the lower edges of the side plates 41 and 41. These components of the cassette holder 39 are integrally formed from sheet metal. The cassette holder 39, having the top plate 40, side plates 41 and 41 and bottom plates 42 and 42, defines therein a space in which the tape cassette 2 can be fitted substantially tightly, as viewed along the front-rear direction indicated by arrows A and B.

The cassette holder 39 is provided with small bumping pieces 42a and 42a projected upward from front end portions of the innermost edges of the bottom plates 42 and 42. The cassette holder 39 is provided also with insertion holes 44, 44—(of which only those on the left side are shown in FIG. 4) in the lugs 43 and 43 and in the side plates 41 and 41 at positions substantially directly above the lugs 43 and 43.

Cassette clamp springs 45, 45 and 45 are fitted to an intermediate portion, with respect to left-right directions, and both left and right end portions of the upper surface of the top plate 40. The clamp springs 45, 45 and 45 are formed of leaf spring material, and front end portions of elastic pieces 45a, 45a and 45a thereof are projected downward to slightly below the top plate 4 through holes formed in the top plate 4.

The cassette holder 39 as above is supported on the cover-raising members 38 and 38 through left and right pairs of support arms 46, 47 best shown in FIGS. 10–12 and 46', 47'.

The support arms 46, 46', 47 and 47' have platelike shape, elongate in front-rear directions, and are approximately equal in length. Of these, the support arms 46 and 46' on one side (hereinafter referred to as "inner support arms") each comprise a front half portion 46a, 46'a of relatively large vertical breadth, and a rear half portion 46b, 46'b projected substantially rearward from an upper end portion of the rear edge of the front half portion 46a, 46'a and bent in a roughly inverted V shape as viewed transversely. The front half portions 46a and 46'a are provided with insertion holes 46c and 46'c at their lower rear end portions, and the rear half portions 46b and 46'b are provided with similar insertion holes 46d and 46'd at their rear end portions. Lower end portions of the front half portions 46a and 46'a are provided, in their rear half portions, with engaging slots 46e and 46'e extending substantially in parallel to the longitudinal direction of the support arms 46 and 46'.

The support arms 47 and 47' on the other side (hereinafter referred to as "outer support arms") are, for the most part, approximately equal in breadth to the rear half portions 46b and 46'b of the inner support arms 46 and 46'. Of each of the outer support arms 47 and 47', a certain length portion on the rear side is bent to a substantially forward and downward side. The outer support arms 47 and 47' are provided with insertion holes 47a and 47'a in their front end portions and with insertion holes 47b, 47'b in their rear end portions.

Front end portions of the inner support arms 46 and 46' are turnably supported on the cover-raising members 38 and 38 via support shafts 48 and 48 which are passed through the insertion holes 46c and 46'c formed in the front end portions and through the lower support holes 38b and 38b formed in the cover-raising members 38 and 38. The rear end portions of the inner support arms 46 and 46' are turnably connected to the cassette holder 39 via support shafts 49 and 49 which are passed through the insertion holes 46d and 46'd formed in the rear end portions and through the insertion holes 44 and 44 formed in the lugs 43 and 43 of the cassette holder 39.

The outer support arms 47 and 47' are located respectively on the outer side (opposite to the side of cassette holder 39) of the inner support arms 46 and 46', in overlapping relationship with the inner support arms 46 and 46'. In this condition, the front end portions of the outer support arms 47 and 47' are turnably supported on the cover-raising members 38 and 38 via support shafts 50, 50 which are passed through the insertion holes 47a and 47'a formed in the front end portions and through the upper insertion holes 38c and 38c formed in the cover-raising members 38 and 38. The rear end portions of the outer support arms 47 and 47' are turnably connected to the cassette holder 39 via support shafts 51, 51 which are passed through the insertion holes 47b, 47'b formed in the rear end portions and through the insertion holes 44 and 44 formed in the side plates 41 and 41 of the cassette holder 39.

Therefore, each pair of the support arms 46-47, 46'-47' constitute a parallel link and, accordingly, the cassette holder 39 connected to turnable end portions of the support arms 46, 46', 47 and 47' is moved forward or downward while maintaining a substantially horizontal posture.

The inside portions 27c and 27c of the link pins 27 and 27 are slidably engaged in the engaging slots 46e and 46'e formed in the inner support arms 46 and 46'. While the link pins 27 and 27 are moved in a direction intersecting the longitudinal direction of the engaging slots 46e and 46'e, therefore, the link pins 27 and 27 press against the lower edges or the upper edges of the slots 46e and 46'e, to turn the support arms 46 and 46', whereby the cassette holder 39 is moved downward or upward.

The link pins 27 and 27, when having reached the aforementioned raised position, are located at the rear end portions of the engaging slots 46e and 46'e of the inner support arms 46 and 46', as shown in FIG. 4. In this condition, the cassette holder 39 is maintained in the ejection position spaced upward, to a certain extent, from the chassis 16.

As the link pins 27 and 27 are moved from the raised position toward the lowered position, the pins 27 and 27 press the lower edges of the engaging slots 46e and 46'e substantially downward, so that the inner support arms 46 and 46' are turned substantially downward and the cassette holder 39 is thereby moved downward. When the link pins 27 and 27 reach the lowered position, the cassette holder 39 reaches the cassette mounting position, where the bottom plates 42 and 42 thereof are close to the upper side of the chassis 16. In this condition, the engaging slots 46e and 46'e are in register with the second guide portions 20b and 20b of the guide slots 20 and 20 formed in the support walls 18 and 18 of the chassis 16, as viewed transversely in FIG. 5.

As the link pins 27 and 27 are moved from the lowered position toward the retracted position, the pins 27 and 27 pass along the longitudinal direction of the engaging slots 46 and 46', so that the inner support arms 46 and 46' are not pressed. Consequently, the cassette holder 39 is maintained in the cassette mounting position while the link pins 27 and 27 are moved between the lowered position and the retracted position.

As the link pins 27 and 27 are moved from the lowered position toward the raised position, the pins 27 and 27 press the upper edges of the engaging slots 46e and 46'e substantially upward, so that the inner support arms 46 and 46' are turned upward and the cassette holder 39 is thereby moved upward. When the link pins 27 and 27 reach the raised position, the cassette holder 39 reaches the ejection position.

When the cover 15 is moved to the open position, the cassette holder 39 is moved to the ejection position, and when the cover 15 is moved from the open position to the half-open position, the cassette holder 39 is moved to the cassette mounting position. While the cover 15 is moved from the half-open position to the closed position, the cassette holder 39 is maintained in the cassette mounting position.

While the cover 15 is moved from the closed position to the half-open position, the cassette holder 39 is not moved but is kept waiting in the cassette mounting position. When the cover 15 is then moved from the half-open position to the open position, the cassette holder 39 is moved to the ejection position.

In short, the cassette holder 39 is moved between the ejection position and the cassette mounting position concurrently and in conjunction with the movement of the cover 15 within a one-third or less portion, on the open position side, of the moving range (stroke) of the cover 15.

Insertion and removal of the tape cassette 2 from the cassette holder 39 are carried out in the condition where the cassette holder 39 is in the ejection position.

With the tape cassette 2 inserted into the cassette holder 39, the shutter 5 of the cassette 2 is relatively pushed by the bumping pieces 42a and 42a of the cassette holder 39 to move toward the open position. When the shutter 5 reaches the open position, the insertion of the tape cassette 2 into the cassette holder 39 is completed. In addition, the top face of the cassette case 39 is elastically contacted by the elastic pieces 45a, 45a and 45a of the cassette clamp springs 45, 45 and 45 provided on the cassette holder 39.

As shown in FIG. 14, when the cassette holder 39 under this condition is moved toward the cassette mounting position, a rear end portion of the cassette case 3 is placed on the rear end portion of the chassis 16 which is slightly higher than the other portions of the chassis 16. In addition, the conical portions 36b and 36b of the cassette-positioning pins 36 and 36 are inserted into the positioning holes 11a and 11a formed in the cassette case 3, and the opening edge portions of the holes 11a and 11a are placed on the flanges 36a and 36a of the pins 36 and 36. As a result, the tape cassette 2 is mounted in the cassette mount section 30 in the state of being fixed in position with respect to horizontal and vertical directions.

The cassette case 3 is pressed against the rear end portion of the chassis 16 and the flanges 36a and 36a of the cassette-positioning pins 36 and 36 by the elastic pieces 45a, 45a and 45a of the cassette clamp pins 45, 45 and 45.

When the tape cassette 2 is mounted into the cassette mount section 30 in this manner, left and right end portions of the front cover 4 are relatively pushed substantially upward by the cover-raising pieces 38d and 38d of the cover-raising members 38 and 38, whereby the front cover 4 is moved to the open position (see FIG. 14). Further, the reel engaging shafts 34 and 34 of the reel bases 31 and 31' are engaged into the reel base engaging holes 6a and 6'a of the tape reels 6 and 6' through the reel base insertion holes 5a and 5a of the shutter 5 and the reel base insertion holes 12 and 12 of the cassette case 3. Consequently, the S-side reel base 31 is coupled with the S-reel 6, and the T-side reel base 31' with the T-reel 6, so that each corresponding reel base and reel can be rotated together.

When the cassette holder 39 with the tape cassette 2 mounted in the cassette mount section 30 is moved toward the ejection position, the tape cassette 2 is detached from the cassette mount section 30, and the front cover 4 is returned into the closed position by the resiliency of a resilient means (not shown). When the tape cassette 2 is removed from the cassette holder 39, the shutter 5 is moved to the closed position by the resiliency of a resilient means (not shown).

Denoted by 52 and 53 are link sliders, which are moved forward and backward in conjunction with the movement of the cover 15, for controlling the positions of loading arms of a tape loading mechanism, lock levers, takeup gears, etc., as will be described later.

A main portion 54 of the left-hand link slider 52 has a platelike shape elongate in the front-rear direction, the length being slightly smaller than the size of the chassis 16 in the same direction.

A main portion 55 of the right-hand link slider 53 also has a platelike shape elongate in the front-rear direction, and is slightly longer than the main portion 54 of the left-hand link slider 52.

Figure 20:
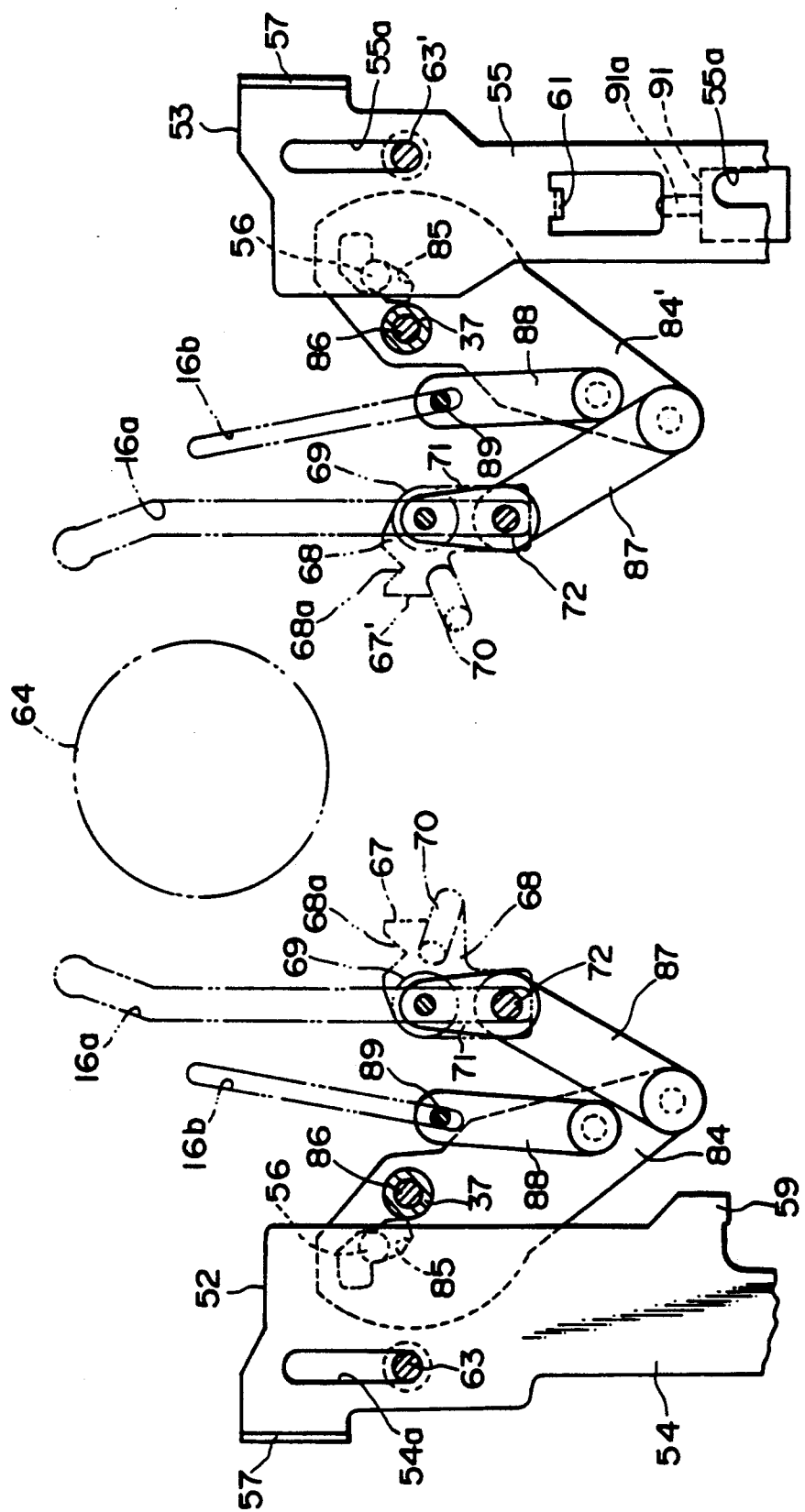
FIG. 20 is a plan view showing those parts of the tape loading mechanism which are located below the mechanism chassis, before tape loading is performed.

The main portions 54 and 55 are provided at their front and rear end portions, with guided slots 54a, 54a and 55a, 55a, shown in FIG. 20 which are elongate in the front-rear direction. Presser pins 56 and 56 are projected on the lower side of front end portions of the main portions 54 and 55, at positions near the inner side edges of the main portions 54 and 55.

Riser pieces 57 and 57 are projected upward from front end portions of the outer side edges of the main portions 54 and 55. The riser pieces 57 and 57 are provided with engaging slots 58 and 58. The engaging slots 58 and 58 extend for the most part in a direction sloping down steeply to the front side, except that lower end portions 58a and 58a thereof extend in the vertical direction shown in FIGS. 8 and 25.

Further, the main portion 54 of the left link slider 52 is provided with a lock portion 59 projected rightward from a substantially middle portion of the right edge of the main portion 54, and with a rack portion 60 along a portion of the right edge near the rear end.

On the other hand, the main portion 55 of the right link slider 53 is provided with a switch presser piece 61 projected downward in a cut-and-bent manner from a substantially middle portion (with respect to the front-rear direction) of the main portion 55, and with a lever presser portion 62 projected leftward from a rear end portion of the left edge of the main portion 55 and located slightly below the rest of the main portion 55. Of the left edge of the lever presser portion 62, a front half portion 62a (hereinafter referred to as "retainer edge") extends in the front-rear direction, while a rear half portion 62b (hereinafter referred to as "slant edge") extends in a substantially backward, slightly rightward direction from the rear end of the retainer edge 62a.

Denoted by 63 and 63 are guide pins projected vertically on the lower side of the chassis 16 at positions near the left edge of the chassis 16. Denoted by 63' and 63' are guide pins similarly projected vertically on the lower side of the chassis 16 at positions near the right edge of the chassis 16. The left-hand link slider 52 is so supported as to be movable forward and rearward with predetermined limits, through slidable engagement of the guided slots 54a and 54a thereof with the guide pins 63 and 63. The right-hand link slider 53 also is supported in a similarly movable condition, through slidable engagement of the guided slots 55a and 55a with the guide pins 63' and 63'.

Figure 8:
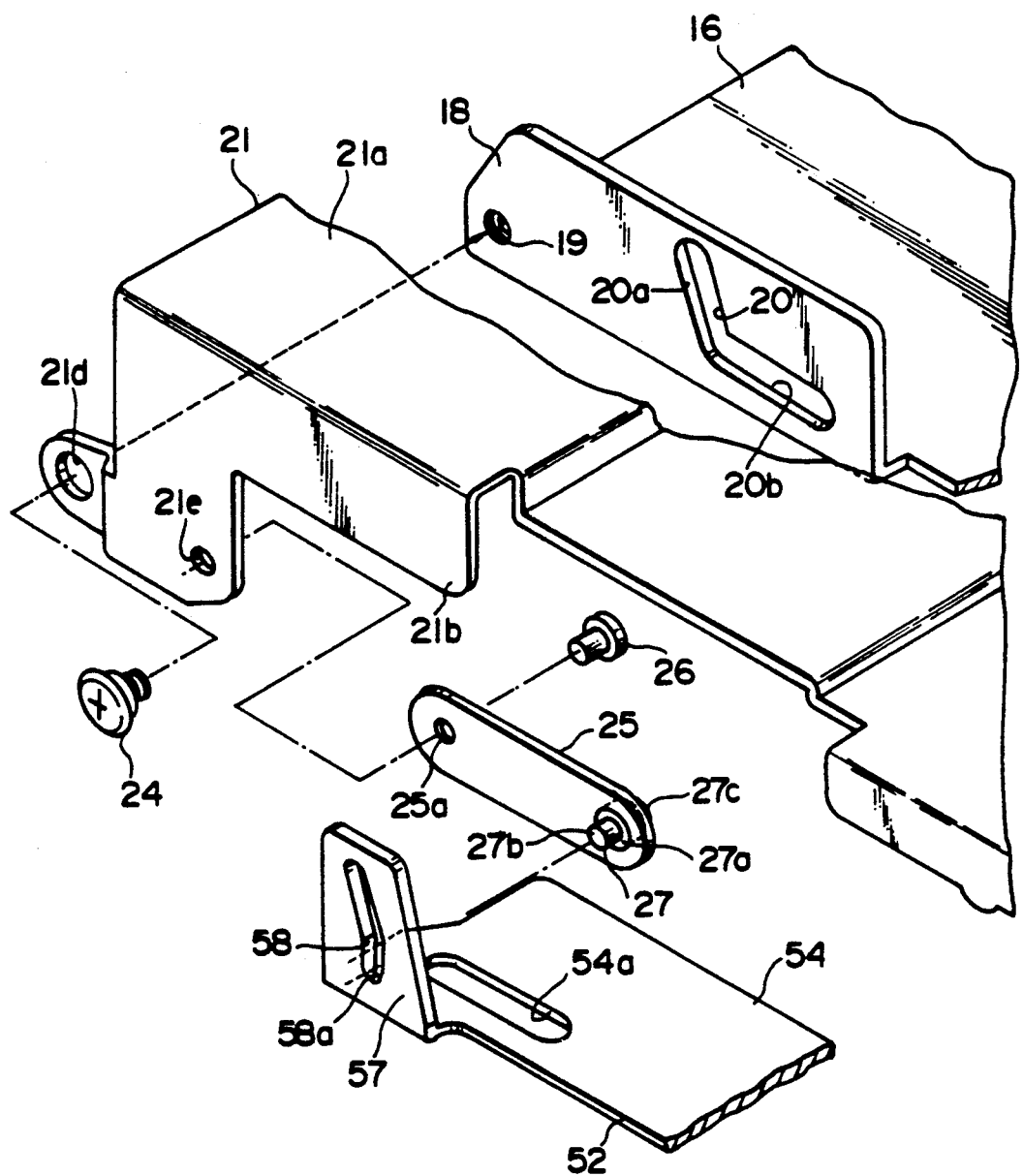
FIG. 8 is an enlarged, exploded perspective view of an embodiment of the present invention showing portions of the cover, a mechanism chassis, a link lever and a link slider.

The outer portions 27b and 27b of the link pins 27 and 27 are slidably engaged in the engaging slots 58 and 58 of the link sliders 52 and 53, respectively as shown in FIG. 8. When the link pins 27 and 27 are moved in a direction intersecting the longitudinal direction of the engaging slots 58 and 58, therefore, the front edges or the rear edges of the slots 58 and 58 are pressed, so that the link sliders 52 and 53 are moved forward or rearward.

When the link pins 27 and 27 are located in the raised position, the outer portions 27b and 27b of the link pins 27 and 27 are located at upper end portions of the engaging slots 58 and 58 of the link sliders 52 and 53. In this condition, each of the link sliders 52 and 53 has come to the front end position of the moving range thereof (hereinafter referred as "advanced position") and, as shown in FIG. 4, the engaging slots 58 and 58 are in register with the first guide portions 20a and 20a of the guide slots 20 and 20 of the chassis 16, as viewed transversely.

Therefore, while the link pins 27 and 27 are moved from the above condition (the raised position) toward the lowered position, the outer portions 27b and 27b thereof are moved along the engaging slots 58 and 58 and, accordingly, the link sliders 52 and 53 are kept waiting in the advanced position without moving therefrom.

When the link pins 27 and 27 reach the lowered position, the outer portions 27b and 27b thereof are located, at upper portions of the lower end portions 58a and 58a of the engaging slots 58 and 58, as shown in FIG. 5. As the link pins 27 and 27 are moved from this condition toward the retracted position, the outer portions 27b and 27b of the pins 27 and 27 press the rear edges of the lower end portions 58a and 58a of the engaging slots 58 and 58 substantially rearward. The pressing causes the link sliders 52 and 53 to move rearward. When the link pins 27 and 27 reach the retracted position, each of the link sliders 52 and 53 reaches the rear end position of the moving range thereof (hereinafter referred to as "retracted position").

When the link pins 27 and 27 are moved from the retracted position to the lowered position, the link sliders 52 and 53 are moved to the advanced position. While the link pins 27 and 27 are moved from this lowered position to the raised position, the link sliders 52 and 53 are maintained in the retracted position.

Thus, the link sliders 52 and 53 are moved between the advanced position and the retracted position concurrently with and in conjunction with the movement of the cover 15 within a two-thirds or more portion, on the closed position side, of the moving range (stroke) of the cover 15.

When the cover 15 has come to the open position, the cassette holder 39 is maintained in the ejection position and the link sliders 52 and 53 in the advanced position. When the cover 15 in this condition is moved to the closed position manually or by an automatic opening/closing means (not shown) for the cover 15, the cassette holder 39 is first moved to the cassette mounting position, and then the link sliders 52 and 53 are moved to the retracted position. Conversely, when the cover 15 is moved from the closed position to the open position, either manually or by an automatic means as above, the link sliders 52 and 53 are first moved to the advanced position, and thereafter the cassette holder 39 is moved to the ejection position.

Figure 3:
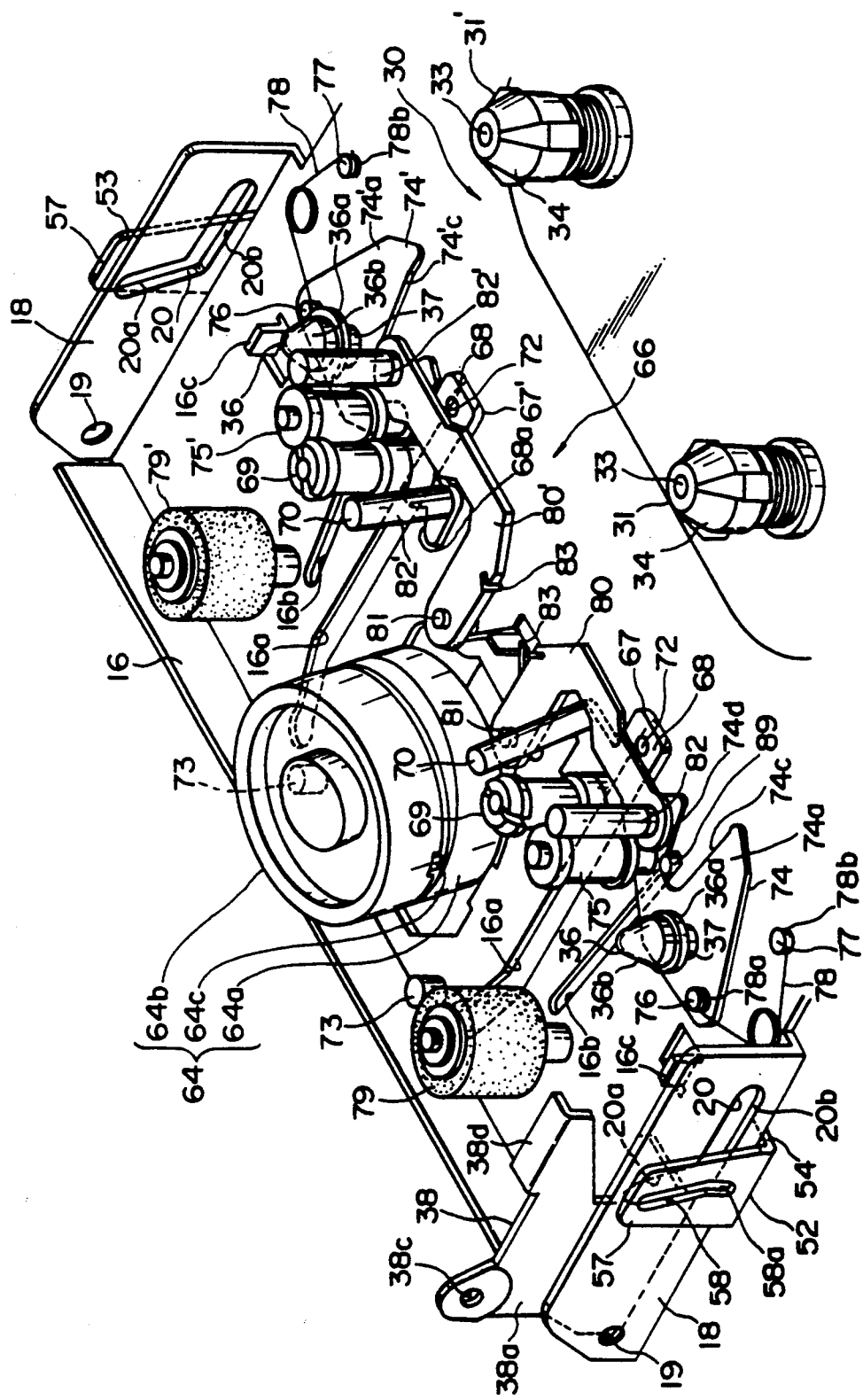
FIG. 3 is an enlarged perspective view of an R-DAT, with the cassette holder and the like detached therefrom.

Denoted by 64 is a head drum, which comprises a lower drum 64a attached to the chassis 16, an upper drum 64b rotatably supported on the lower drum 64a, and two rotary magnetic heads 64c and 64c (only one of which is shown in FIG. 3) rotated together with the upper drum 64a. The head drum 64 is disposed at a substantially central position of a front end portion of the chassis 16, in a posture of being slightly inclined to the front side.

A motor 65 is provided for rotating the upper head drum 64b.

Denoted by 66 is a tape loading mechanism for drawing out a predetermined length of a magnetic tape 7 from a tape cassette 2 mounted in the cassette mount section 30 and for setting the drawn-out tape portion along a predetermined tape path. The tape loading mechanism 66 comprises: moving blocks, rocker guides and tape tension regulator pins, which are movably supported on the chassis 16; levers supporting these movable members; catchers and tension rollers, which are fixed on the chassis 16; and loading arms turned by the link sliders 52 and 53 so as to move the moving blocks, levers and the like.

As shown in FIGS. 15-19, 67 and 67' comprise moving bases 68 and 68 to be moved along guide grooves 16a and 16a which are cut in the chassis 16 substantially in front-rear direction and on the left and right sides of the head drum 64 (hereinafter referred to as "first guide grooves"), vertical guide posts 69 and 69 and slant guide posts 70 and 70, the vertical and slant guide posts being projected upward from the moving bases 68 and 68. The moving bases 68 and 68 are provided with roughly V-shaped positioning notches 68a and 68a at front edges thereof.

Denoted by 71 and 71 are lower base plates disposed on the lower side of the chassis 16, and coupled to the moving bases 68 and 68 by connecting pins 72 and 72 slidably engaged with the first guide grooves 16a, 16a. The moving bases 68 and 68 and the lower base plates 71 and 71 clamp side edge portions of the first guide grooves 16a, 16a therebetween in the thickness direction of the chassis 16, whereby the position of the moving blocks 67, 67 in vertical direction is determined.

Cylindrical catchers 73 and 73 are erected on the upper surface of the chassis 16 near the front ends of the first guide grooves 16a, 16a.

Rocker levers 74 and 74' with rocker guides 75 and 75' supported thereon are disposed on the upper side of the chassis 16, and supported horizontally rotatably on top portions of the support members 37 and 37 to which the cassette-positioning pins 36 and 36 are screwed.

Figure 16:
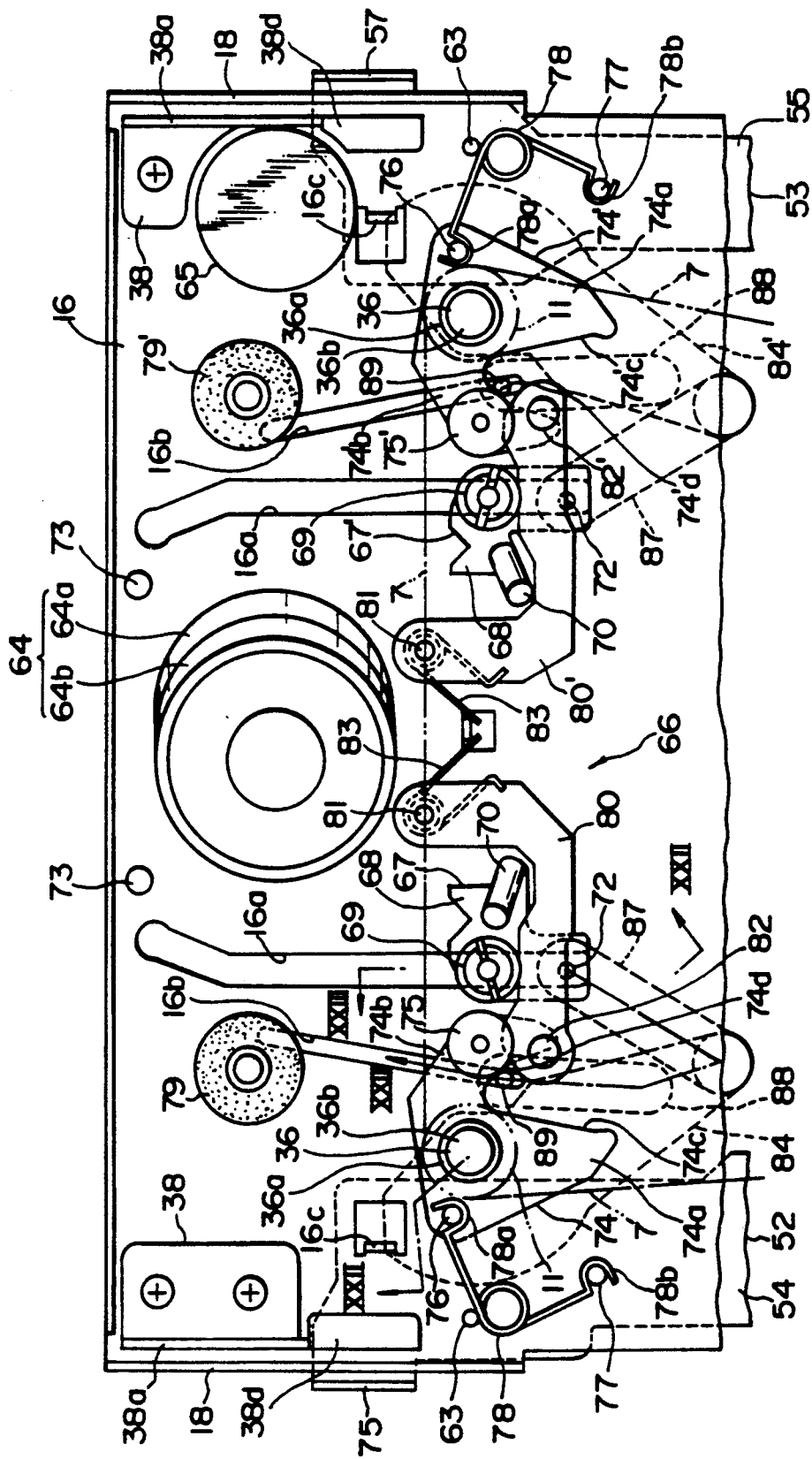
FIG. 16 is an enlarged plan view of a tape loading mechanism of the present invention before tape loading is performed.

In the condition where the rocker levers 74 and 74' are located in the position as shown in FIG. 16 (hereinafter referred to as "initial position"), those half portions 74a and 74'a of the rocker levers 74 and 74' which are farther apart from each other, as viewed from above, have a substantially triangular shape, being elongate in the front-rear direction and with their breadth decreasing to the rear side. Extending portions 74b and 74'b of the rocker levers 74 and 74' extend substantially rearward in a bent form resembling an angle bracket "<", from front end portions of opposed side edges 74c and 74'c of the half portions 74a and 74'a which edges extend substantially in the front-rear direction. Front end portions of the half portions 74a and 74'a are turnably supported on top portions of the support members 37 and 37 (see FIG. 22), and the rocker guides 75, 75 are rotatably supported on support shafts erected near the bends of the extending portions 74b and 74'b.

Denoted by 76 and 76 are spring retainer pins projected on the half portions 74 and 74'a at positions spaced from the cassette-positioning pins 36 and 36 to the opposite sides and slightly to the front side. Also, spring retainer pins 77 and 77 are projected on the upper surface of the chassis 16 at positions spaced from the cassette-positioning pins 36 and 36 to the outer and rear sides.

Denoted by 78 and 78 are toggle springs of scissor-shaped form, which are fitted to the spring retainer pins 76 and 76 of the rocker levers 74 and 74' at one-end portions 78a and 78a and to the spring retainer pins 77 and 77 on the chassis 16 at other-end portions 78b and 78b.

Figure 17:
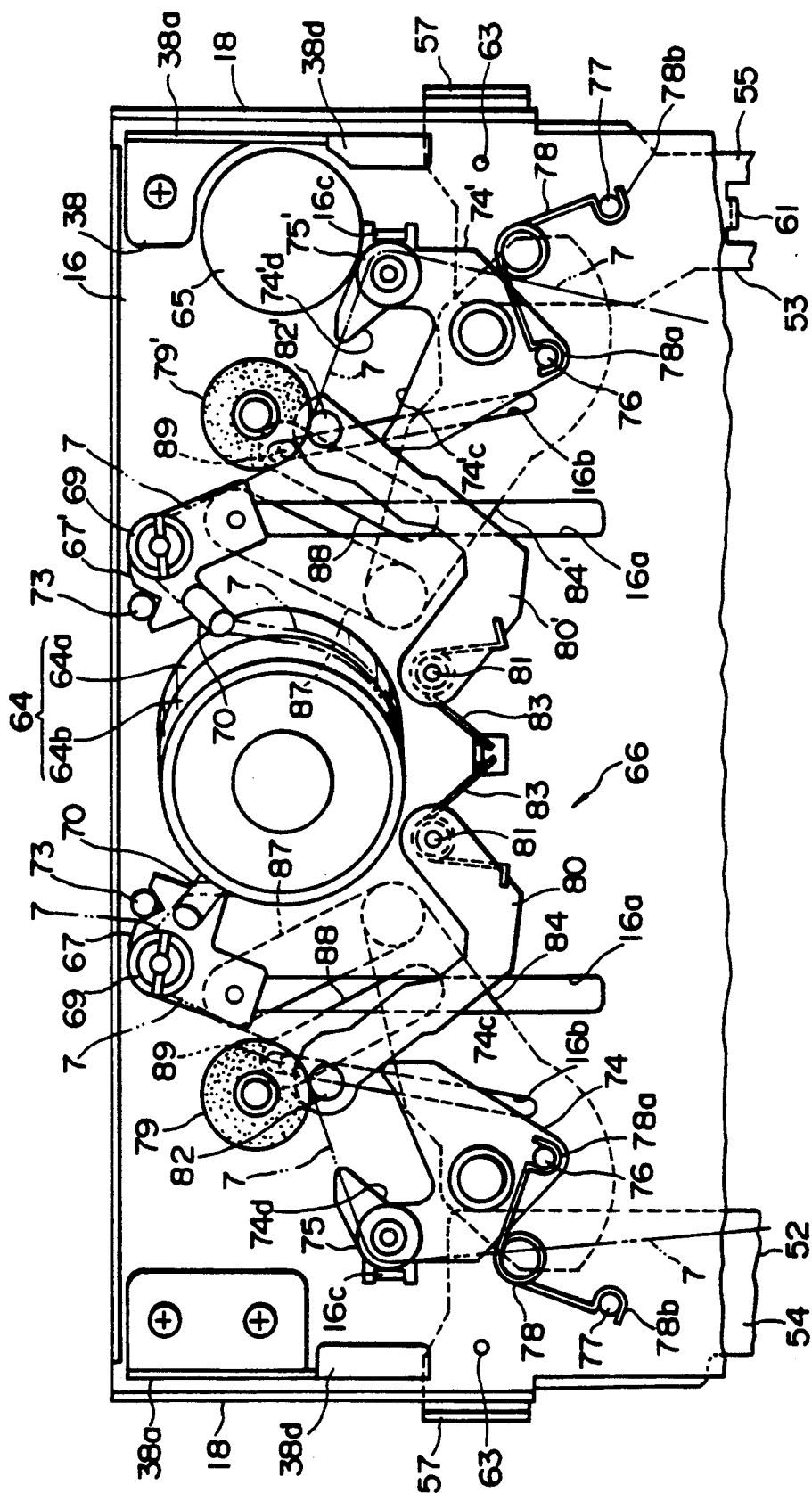
FIG. 17 is an enlarged plan view of the tape loading mechanism of the present invention upon completion of tape loading.
Figure 18:
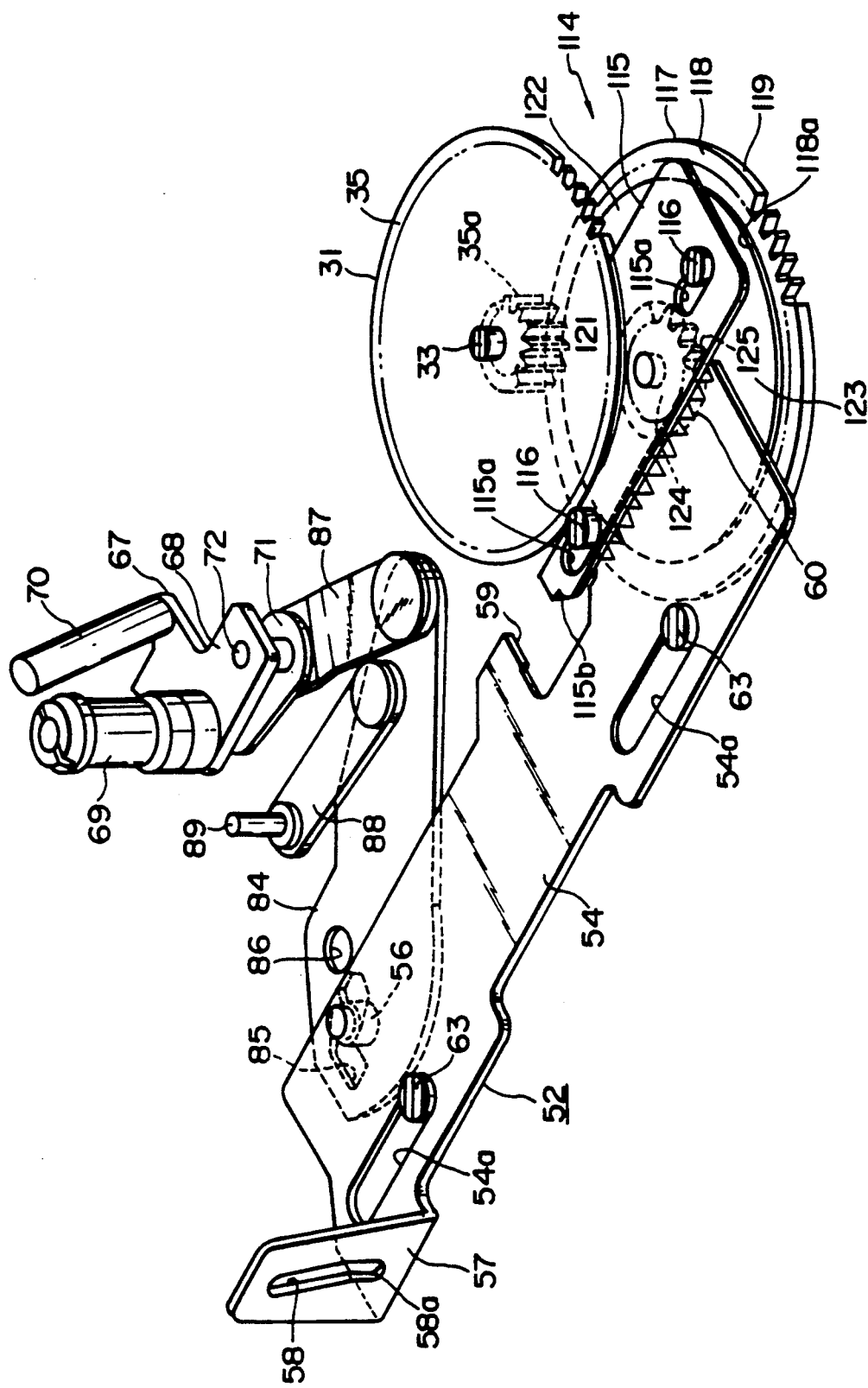
FIG. 18 is an enlarged perspective view of an embodiment of the present invention showing a and link slider, a member under position control by the link slider.
Figure 19:
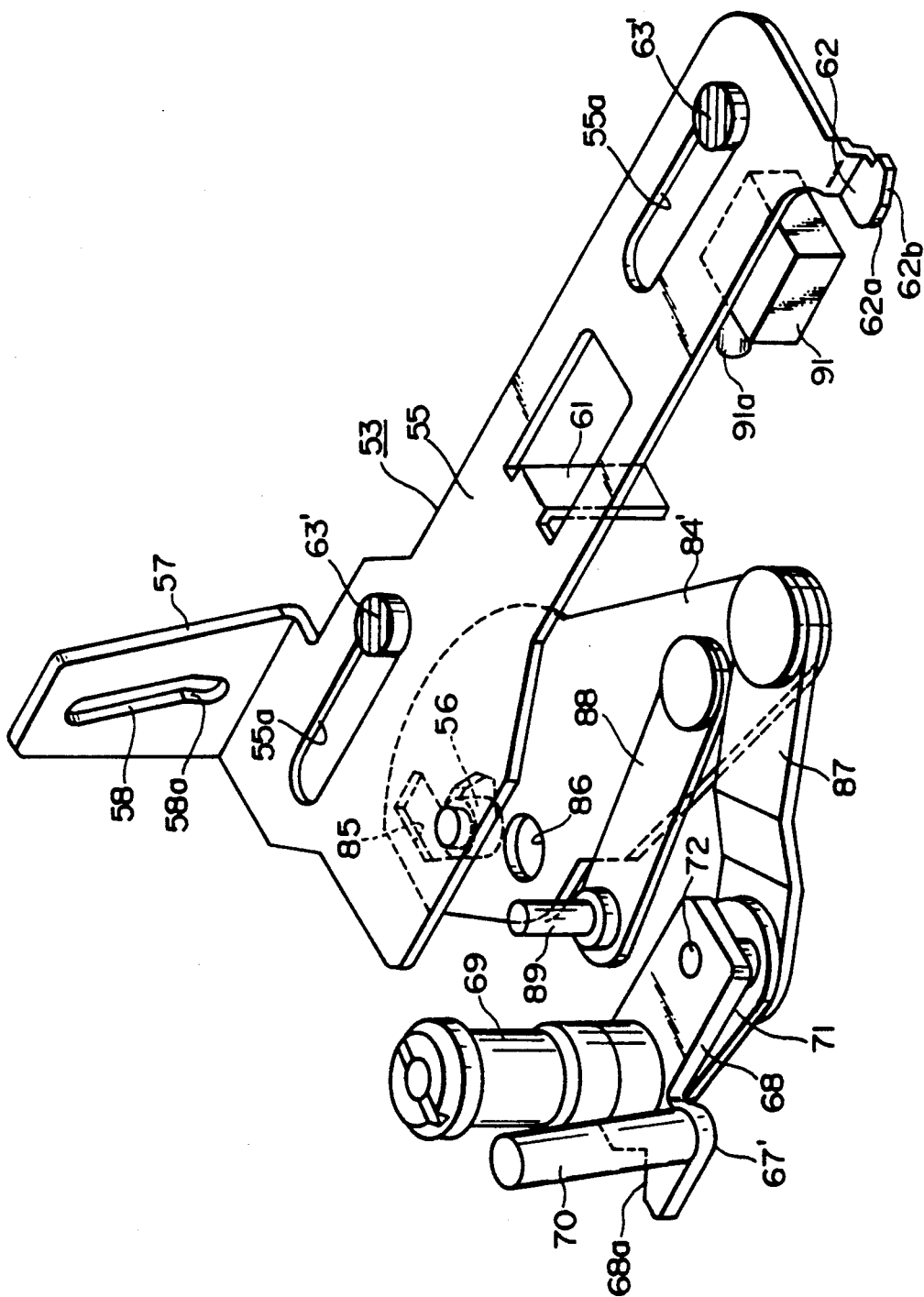
FIG. 19 is an enlarged perspective view of a and link slider, a part of the tape loading mechanism of the present invention.

Therefore the rocker levers 74 and 74' are given a clockwise or counterclockwise torque (as viewed from above) by the resiliency of the toggle springs 78 and 78. Thus, when the one-end portions 78a and 78a of the toggle springs 78 and 78 are each located, for example, on the front side with respect to a straight line passing through the other-end portion 78b, 78b and the center of turning of the rocker lever 74, 74', i.e. the dead-center line, as shown in FIG. 16, a clockwise torque is exerted on the left-hand rocker lever 74, and a counterclockwise torque on the right-hand rocker lever 74'. On the other hand, when the one-end portions 78b and 78b of the toggle springs 78 and 78 are each located on the rear side with respect to the dead-center line, as shown in FIG. 17, a counterclockwise torque is exerted on the left rocker lever 74, and a clockwise torque on the right rocker lever 74'.

Of the extending portions 74b and 74'b of the rocker levers 74 and 74' on which the rocker guides 75 and 75' are erected, outer side edges 74d and 74'd extending in a bent form resembling an angle bracket "<" are pressed by restrictor pins (described later) at the time of a tape loading operation (these edges hereinafter referred to as "first pressed edges"). On the other hand, other side edges 74c and 74'c of the rocker levers 74 and 74' are pressed by restrictor pins (described later) at the time of a tape unloading operation (these edges hereinafter referred to as "second pressed edges").

Denoted by 16b and 16b are guide grooves formed in the chassis 16 (hereinafter referred to as "second guide grooves"). Each of the second guide grooves 16b and 16b is formed on the opposite side of the first guide groove 16a, 16a from the head drum 64, and extends at slight inclination relative to the front-rear direction. The second guide grooves 16b and 16b extend forward to positions substantially corresponding to a central portion of the head drum 64.

Tension rollers 79 and 79' formed from rubber material are rotatably supported on support shafts which are erected on the chassis 16 near the front ends of the second guide grooves 16b and 16b.

Tape tension regulator arms 80 and 80' are roughly L shaped, as viewed from above. Shorter arm portions of the tape tension regulator arms 80 and 80' are horizontally turnably supported at their tip portions on support shafts 81 and 81 which are erected on the chassis 16 on the rear side of and close to the head drum 64. On the other hand, longer arm portions are provided with cylindrical tension regulator pins 82 and 82' on their tip portions. Torsion springs 83 and 83 are provided between each tape tension regulator arm 80 and 80' and the chassis 16, so that a clockwise torque is exerted on the left tape tension regulator arm 80 and a counterclockwise torque on the right tape tension regulator arm 80', as viewed from above.

Loading arms 84 and 84' disposed under the chassis 16 are flat platelike members which are roughly wedge-shaped as viewed from above, and provided with roughly crank-shaped controlled holes 85 and 85 in their broader end portions. The loading arms 84 and 84' have insertion holes 86 and 86 formed near the controlled holes 85 and 85 (see FIGS. 18 and 19). Lower end portions of the support members 37 and 37 on which the cassette-positioning pins 36 and 36 are screwed are passed through the insertion holes 86 and 86 so as to be turnable relative to the loading arms 84 and 84' (see FIG. 22). Thus, the loading arms 84 and 84' are supported horizontally rotatably on the support members 37 and 37.

Figure 23:
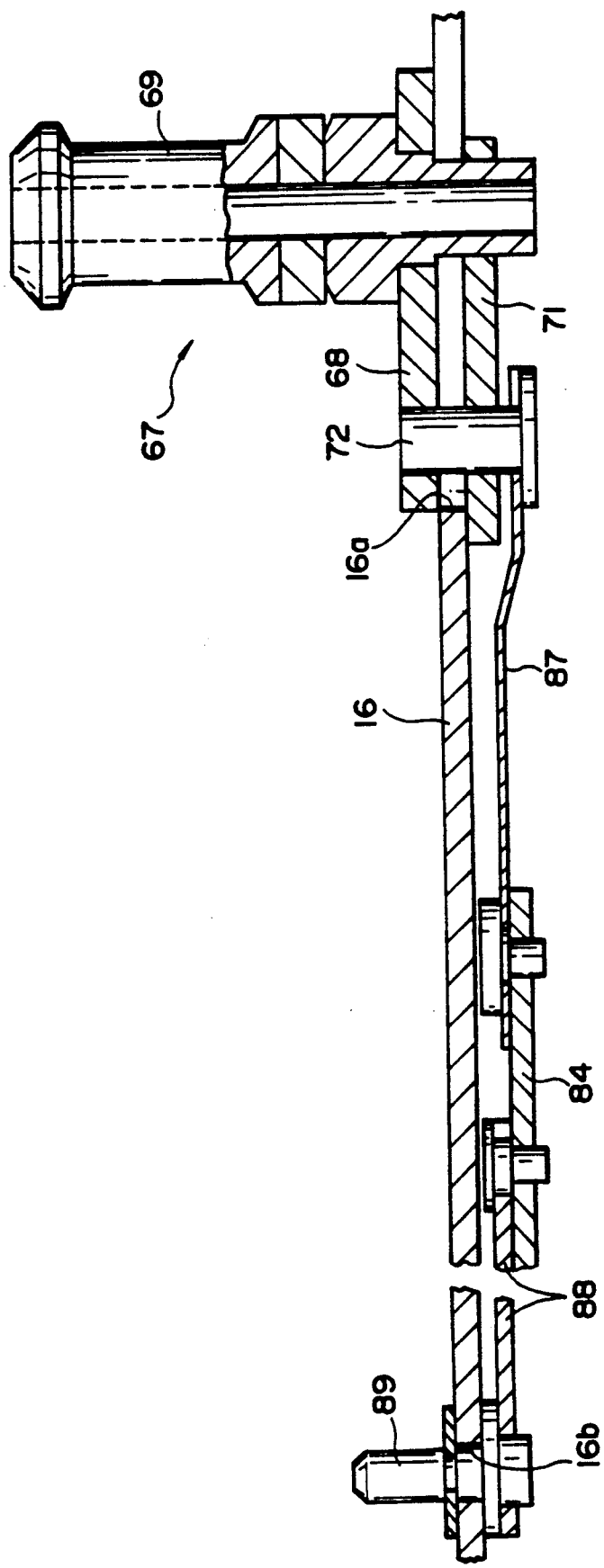
FIG. 23 is an enlarged sectional view taken along line XXIII—XXIII of FIG. 16.

Link levers 87 and 87, formed from leaf spring material, are pivotally connected at one end respectively to the other end portions of the loading arms 84 and 84' (see FIG. 23), and at the other end respectively to the lower end portions of the link pins 72 and 72 of the moving blocks 67 and 67'. The moving blocks 67 and 67' are thereby connected to the loading arms 84 and 84' respectively.

Restrictor levers 88 and 88 are pivotally connected at one end respectively to portions near the other end portions of the loading arms 84 and 84', and are provided at the other end respectively with cylindrical restrictor pins 89 and 89. Upper portions of the restrictor pins 89 and 89 are slidably inserted through the second guide grooves 16b and 16b to protrude above the chassis 16.

The presser pins 56 and 56 provided on the link sliders 52 and 53 are slidably inserted in the controlled holes 85 and 85 of the loading arms 84 and 84'. When the link sliders 52 and 53 are moved, the presser pins 56 and 56 thereon press against the inner edges of the controlled holes 85 and 85, so that the loading arms 84 and 84' are turned.

When the link slider 52 and 53 are located at the advanced position, therefore, the presser pins 56 and 56 thereon are located at substantially central points in the controlled holes 85 and 85' of the loading arms 84 and 84'. This causes the loading arms 84 and 84' to be maintained in the initial position, in the form of being opened wider apart to the front side, as shown in FIG. 20. Under this condition the moving blocks 67 and 67' are maintained in their initial positions on the rear end portions of the first guide grooves 16a and 16a, whereas the restrictor pins 89 and 89 are maintained on the rear end portions of the second guide grooves 16b and 16b.

Under the above condition, a clockwise torque is exerted on the left rocker lever 74 by the resilience of the toggle spring 78, and a counterclockwise torque on the right rocker lever 74' by the other toggle spring 78. The turning motions caused by the torques are stopped when the first pressed edges 74d and 74'd come into contact with the restrictor pins 89 and 89 respectively (see FIG. 16). Consequently, the rocker levers 74 and 74' are maintained in the initial position with the rocker guides 75 and 75' located close sideways to the moving blocks 67 and 67', respectively, as shown in FIG. 16.

In the condition of FIG. 16, furthermore, the turnable end portions of the tape tension regulator arms 80 and 80' have come into contact with lower end portions of the rocker guides 75 and 75' from the rear side, so that the regulator arms 80 and 80' are prevented from moving further forward. With the movement of the tape tension regulator arms 80 and 80' inhibited by the rocker guides 75, 75 in this manner, the tape tension regulator pins 82 and 82' are maintained in their initial positions on the immediate rear side of the rocker guides 75 and 75'.

The condition as described above is the initial condition, which is maintained as long as the link sliders 52 and 53 are waiting in the advanced position, namely, as long as the cover 15 is located between the open position and the closed position.

As has been described above, when the cassette holder 39 with the tape cassette 2 mounted therein is moved to the cassette mounting position, the cassette 2 is mounted into the cassette mount section 30. When the mounting of the tape cassette 2 into the cassette mount section 30 is completed, all of the vertical guide posts 69, 69 and slant guide posts 70 and 70 on the moving blocks 67, 67' as well as the rocker guides 75, 75' and the tape tension regulator pins 82, 82' are relatively located in the tape drawing-out recess 10 of the cassette case 3, namely, on the inside of that portion of the magnetic tape 7 which is passed along the tape draw-out surface 8 of the cassette case 3 (see FIG. 16).

In this condition, the cover 15 has come to the half-open position.

Tape loading is effected by movement of the cover 15 from this condition to the closed position.

Figure 21:
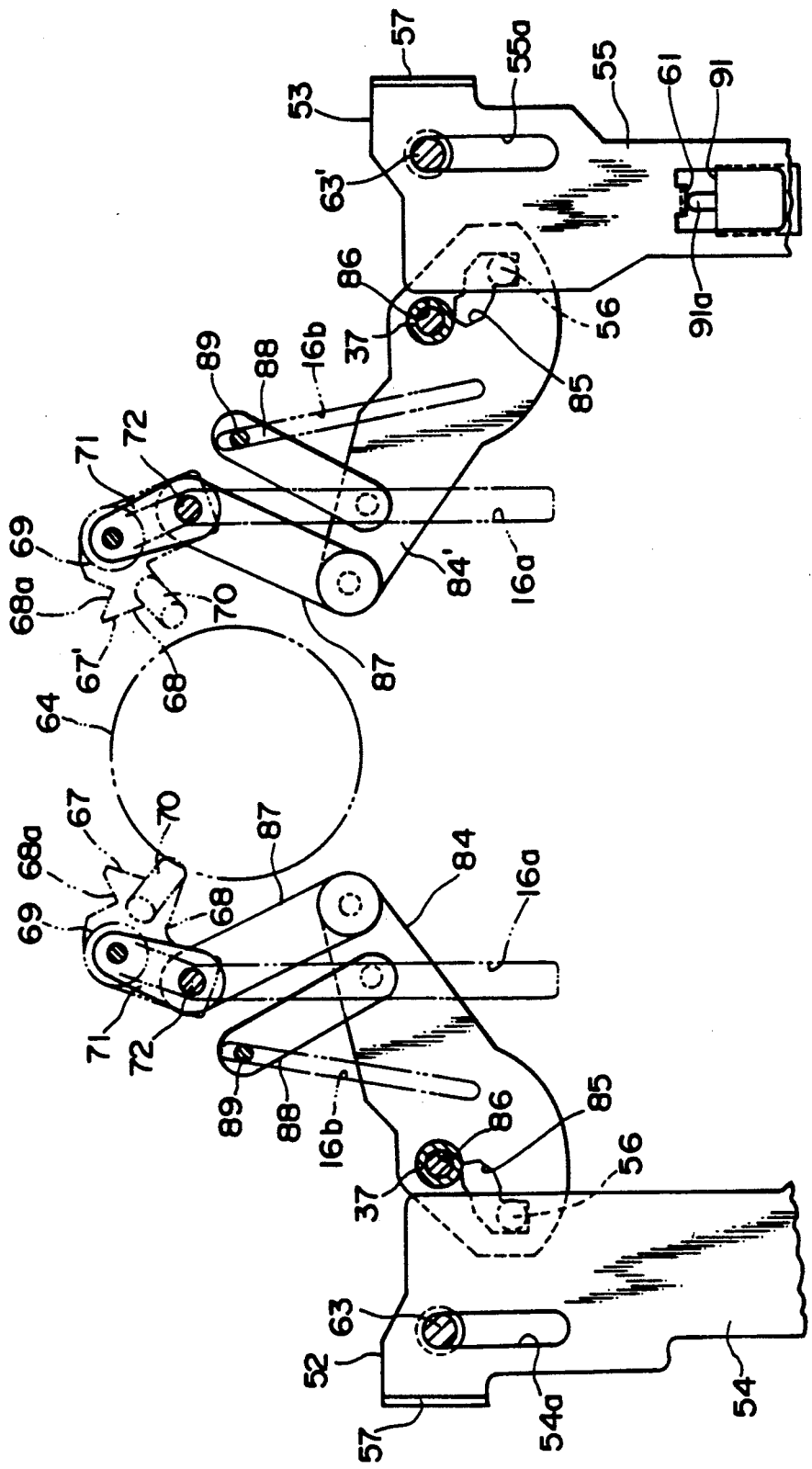
FIG. 21 is a plan view of those parts of the tape loading mechanism which are located below the mechanism chassis, upon completion of tape loading.

As has been described above, when the cover 15 is moved from the half-open position to the closed position, the link sliders 52 and 53 having been located in the advanced position are moved to the retracted position. This causes the presser pins 56 and 56 to press against the inner edges of the controlled holes 85 and 85 of the loading arms 84 and 84' respectively, so that the left loading arm 84 is turned counterclockwise and the right loading arm 84' clockwise, whereby the loading arms 84 and 84' are moved to the loading end position as shown in FIG. 21.

Due to the above movements, the link pins 72 and 72 on the moving blocks 67 and 67' are pressed substantially to the front side by the turnable ends of the loading arms 84 and 84' through the link levers 87 and 87, and are therefore moved forward along the first guide grooves 16a, 16a. Accordingly, the moving blocks 67 and 67' are brought to the loading end positions close to the head drum 64 from the left front side and from the right front side, respectively, and are positioned in the loading end positions by the contact of the notches 68a and 68a of the moving bases 68 and 68 with the catchers 73 and 73.

When the loading arms 84 and 84' are moved to the loading end position, the restrictor pins 89 and 89 are moved to front end portions of the second guide grooves 16b and 16b. During the movement, the restrictor pins 89 and 89 press the first pressed edges 74d and 74'd of the rocker levers 74 and 74' substantially forward, whereby the left rocker lever 74 is turned counterclockwise and the right rocker lever 74' clockwise. When the rocker levers 74 and 74' each come to a certain position, the torque exerted by the toggle springs 78 and 78 is activated; from then on, the rocker levers 74 and 74' are turned by the torque based on the resiliency of the toggle springs 78, 78. The turning of the rocker levers 74 and 74' continues until the turnable end portions of the extending portions 74b and 74'b of the rocker levers 74 and 74' come into contact respectively with the stopper pieces 16c, 16c provided in a cut-and-bent form on the chassis 16, as shown in FIG. 17.

As a result, the rocker guides 75 and 75' are moved to the loading end positions close respectively to the tape outlets 9 and 9 of the cassette casing 3 from the front side.

The tape tension regulator arms 80 and 80' starts being turned by the torque based on the resilience of the torsion springs 83 and 83, from the time when the rocker guides 75 and 75' come out of the paths of the turnable end portions of the regulator arms 80 and 80', respectively. Consequently, the tape tension regulator pins 82 and 82' are moved to the loading end position where they make contact with the outer periphery surfaces of the tension rollers 79 and 79', respectively.

In this way, a predetermined length of the magnetic tape 7 is drawn out of the cassette case 3 and passed through the path shown in FIG. 17.

The magnetic tape 7 thus set along the path is in the condition as follows. The the magnetic tape 7 is unwound from the S-reel 6, wrapped around the left rocker guide 75 upon emerging from the tape outlet 9c on one side, then wrapped around the left tension roller 79, and wrapped around the vertical guide post 69 and slant guide post 70 on the left moving block 67 in that order. Upon being wrapped around the slant guide post 70, the magnetic tape 7 is curved back to the rear side. Then the magnetic tape 7 is spirally wrapped around the outer peripheral surface of the head drum 64 through a center angle of about 180°, and wrapped around the slant guide post 70 and vertical guide post 69 on the right moving block 67' in that order. The magnetic tape 7 is then wrapped around the right rocker guide 75' around the right tension roller 79', and is led through the other tape outlet 9 into the cassette case 3, to be taken up on the T-reel 6'.

The tape tension regulator pins 82 and 82' and the corresponding tension rollers 79 and 79' press against each other, clamping the magnetic tape 7 therebetween.

In this way, tape loading is performed.

Denoted by 90 is a circuit board disposed at a bottom portion inside the casing main portion 14, with a microswitch-type detection switch 91 fitted on an intermediate portion of a right-hand portion of the upper surface of the circuit board 90. The detection switch 91 has a pressed element 91a faced from the rear side by a switch presser piece 61 of the right-hand link slider 53. Simultaneously when the link slider 53 comes to its retracted position, the switch presser piece 61 presses the presser element 91a (see FIG. 21), whereby completion of tape loading is detected.

Feeding of the magnetic tape 7 is effected by the rotation of the T-side reel base 31' in the tape takeup direction or by the rotation of the S-side reel base 31 in the tape takeup direction, in the condition where the tape loading has been finished. When the T-side reel base 31' is rotated, the magnetic tape 7 is fed in such a direction as to be unwound from the S-reel 6 and taken up on the T-reel 6' (the direction hereinafter referred to as "normal direction"); when the S-side reel base 31 is rotated, on the other hand, the magnetic tape 7 is fed in the reverse direction, i.e. the direction reverse to the normal direction.

When the magnetic tape 7 is fed in the normal direction, the left-side tape tension regulator pin 82 is brought into elastic contact with the left tension roller 79, whereby a back tension is exerted on the tape 7. When the magnetic tape 7 is fed in the reverse direction, the right-hand tape tension regulator pin 82' is brought into elastic contact with the right tension roller 79', thereby applying a back tension to the tape 7.

Reading or writing of signals on the magnetic tape 7 is carried out by rotating the upper drum 64b of the head drum 64 and helically scanning the recording surface of the magnetic tape 7 with the rotary magnetic heads 64b and 64c under the condition where the magnetic tape 7 is being fed.

The tape loading mechanism 66 in the aforementioned tape loading end condition is set into the initial condition (the condition before tape loading) by the movement of the cover 15 from the previous closed position to the half-open position.

Specifically, when the cover 15 being in the closed position is moved to the half-open position, the link sliders 52 and 53 are returned from the previous retracted position to the advanced position thereof. Therefore, the presser pins 56 and 56 of the link sliders 52 and 53 press the inner edges of the controlled holes 85 and 85 in the loading arms 84 and 84', whereby the loading arms 84 and 84' are returned to their initial position.

Consequently, the connection pins 72 and 72 of the moving blocks 67 and 67' are pulled substantially rearward through the connection levers 87 and 87, whereby the moving blocks 67 and 67' are returned to their initial position and, concurrently, the restrictor pins 89 and 89 are each returned to the rear end portion of the second guide grooves 16b and 16b.

When moved to the rear side, the restrictor pins 89 and 89 press the turning end portions of the tape tension regulator arms 80 and 80' substantially rearward and, in addition, make contact with the second pressed edges 74a and 74'a of the rocker levers 74 and 74' to press the edges substantially rearward. Therefore, the tape tension regulator arms 80 and 80' and the rocker levers 74 and 74' are moved toward their respective initial positions. When the rocker levers 74 and 74' have each come to a certain position, the turning forces exerted on the levers 74 and 74' by the toggle springs 78 and 78 is activated. From then on, the left rocker lever 74 is turned clockwise by the resilience of the toggle spring 78, and the right rocker lever 74' counterclockwise by the resilience of the other toggle spring 78. The rocker guides 75 and 75' come into contact with the turning end portions of the tape tension regulator arms 80 and 80', and press the portions substantially rearward. When the restrictor pins 89 and 89 come to their initial position, the rocker levers 74 and 74' reach their initial position and, also, the tape tension regulator pins 82 and 82' arrive at their initial position.

In this way, the tape loading mechanism 66 is put into the initial condition thereof.

While the cover 15 is moved from the open position to the half-open position, the cassette holder 39 is moved from the ejection position to the cassette mounting position. If a tape cassette 2 has been mounted in the cassette holder 39, the tape cassette 2 is mounted into the cassette mount section 30, whereas the tape loading mechanism 66 is left in the initial position. The subsequent movement of the cover 15 to the closed position closes the opening side of the cassette mount section 30 with the cover 15 and, at the same time, places the tape loading mechanism 66 into the tape loading end conditions.

Conversely, when the cover 15 is moved from the closed position to the half-open position, the tape loading mechanism 66 is put into the initial condition, while the cassette holder 39 is maintained in the cassette mounting position. The subsequent movement of the cover 15 to the open position opens the opening side of the cassette mount section 30 and, simultaneously, causes the cassette holder 39 to move to the ejection position, thereby enabling the tape cassette 2 to be ejected.

Until the tape loading is finished, the T-side reel base 31' is locked by a compound lock lever (described later) so as to ensure that, during the tape loading, the magnetic tape 7 is let out exclusively from the S-reel 6.

When the tape loading mechanism 66 is transferred from the tape loading end condition to the initial condition, the S-side reel base 31 is rotated in the tape takeup direction by a takeup gear (described later) which in turn is rotated by the left-hand link slider 52 moved to the advanced position. By the rotation of the S-side reel base 31, the magnetic tape 7 is taken up on the S-reel 6.

Denoted by 92 is a reel base drive for selective rotation of either of the two reel bases 31 and 31' in a tape takeup direction. The reel base drive 92 comprises an exclusive motor, an oscillating lever supporting thereon an oscillating gear which is rotated by the motor, and the like.

Figure 26:
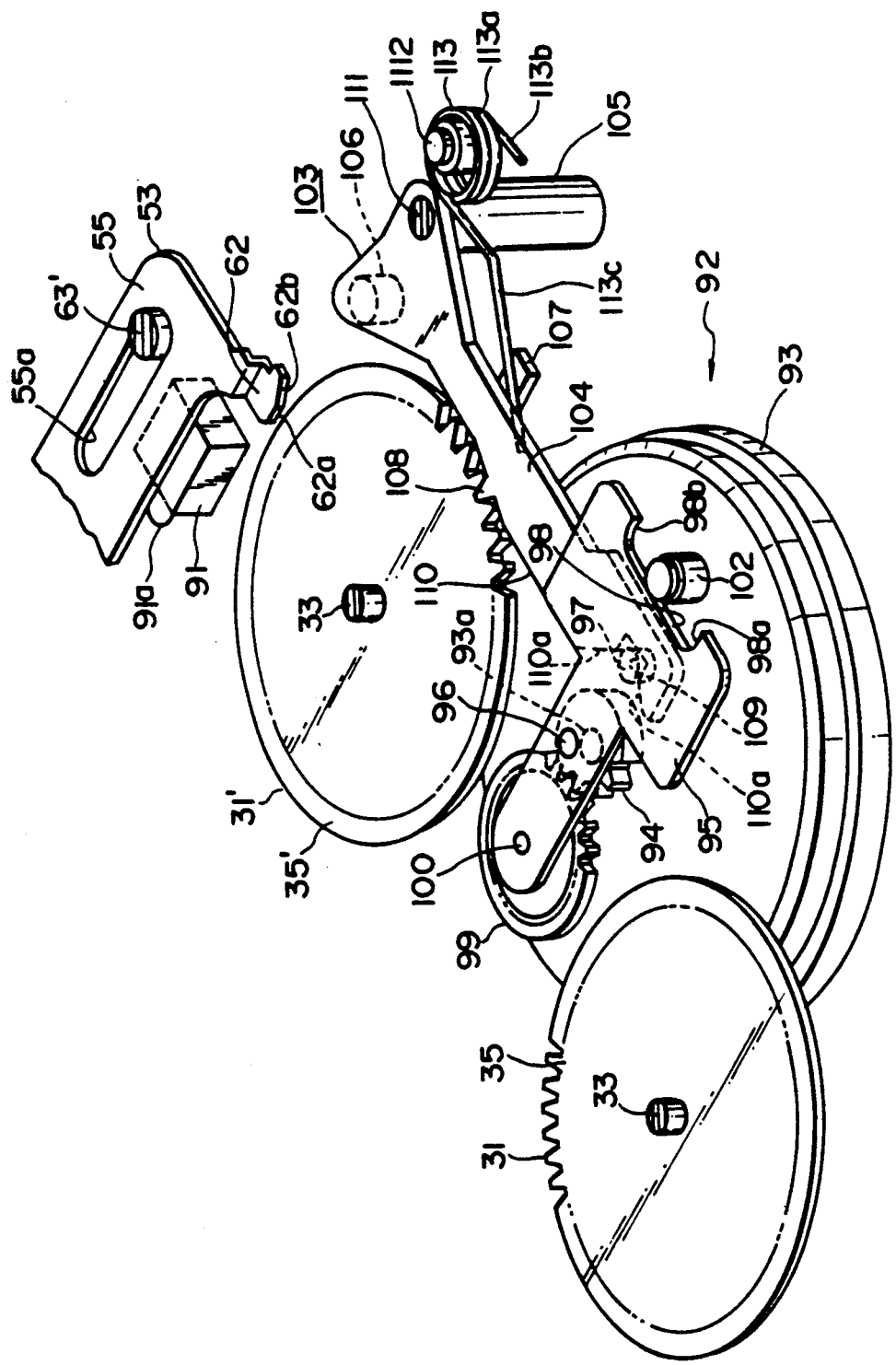
FIG. 26 is an enlarged perspective view of the reel base drive and reel base lock means of the present invention.
Figure 27:
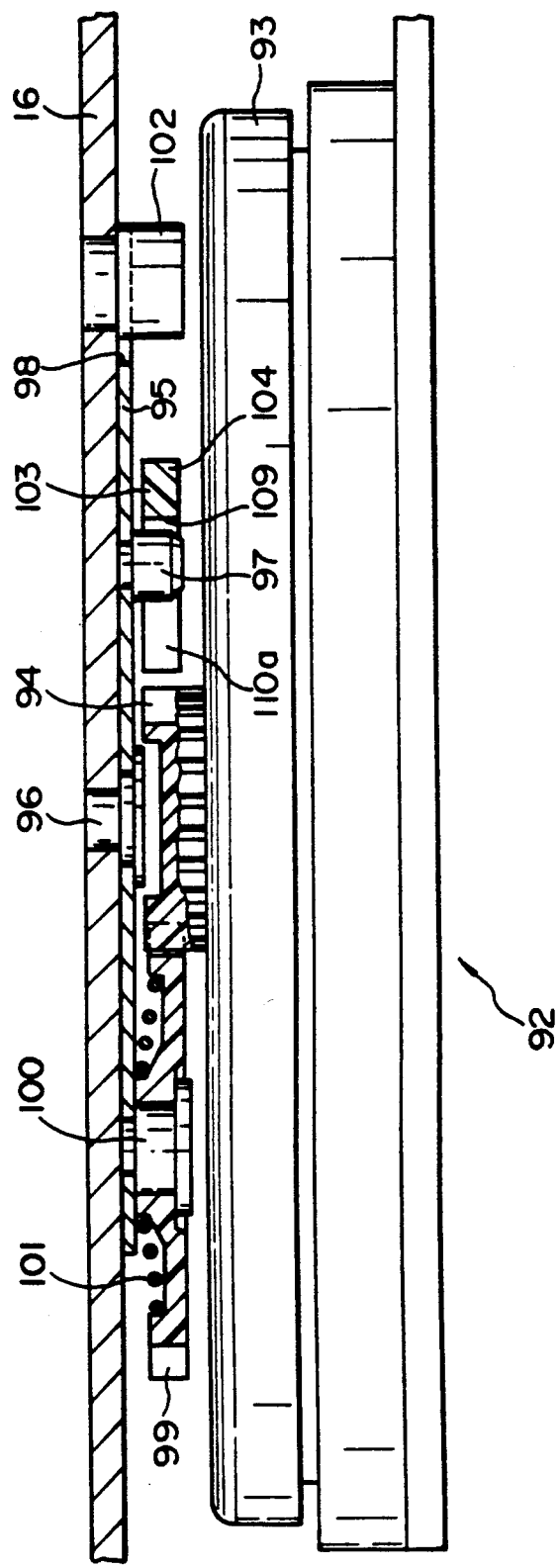
FIG. 27 is an enlarged sectional view taken along line XXVII—XXVII of FIG. 24.

The motor 93 is a flat motor attached to the lower surface of the chassis 16, at a substantially central position of a front end portion. To a top portion of a rotary shaft 93a of the motor 93 is attached a drive gear 94 having a relatively small diameter and located near the lower surface of the chassis 16 as shown in FIGS. 26 and 27.

The oscillating lever 95 has a roughly T-shaped platelike form, and is turnably supported near the center thereof on a support shaft 96 fixed on the lower surface of the chassis 16 in a coaxial positional relationship with the drive gear 94 as illustrated in FIGS. 24–27. A restricted pin 97 is attached to a nearly central position of the lower surface of a laterally broad rear end portion of the oscillating lever 95, and the lever 95 is provided with a cutout 98 along the rear edge thereof, except left and right end portions of the rear edge.

The oscillating gear 99, of a substantially spur gear-like form, is rotatably supported at its center on a support shaft 100 attached to the lower surface of a front end portion of the oscillating lever 95. The oscillating gear 99 is engaged by the drive gear 94 on the front side, and located between the input gears 35 and 35' of the reel bases 31 and 31'.

Figure 28:
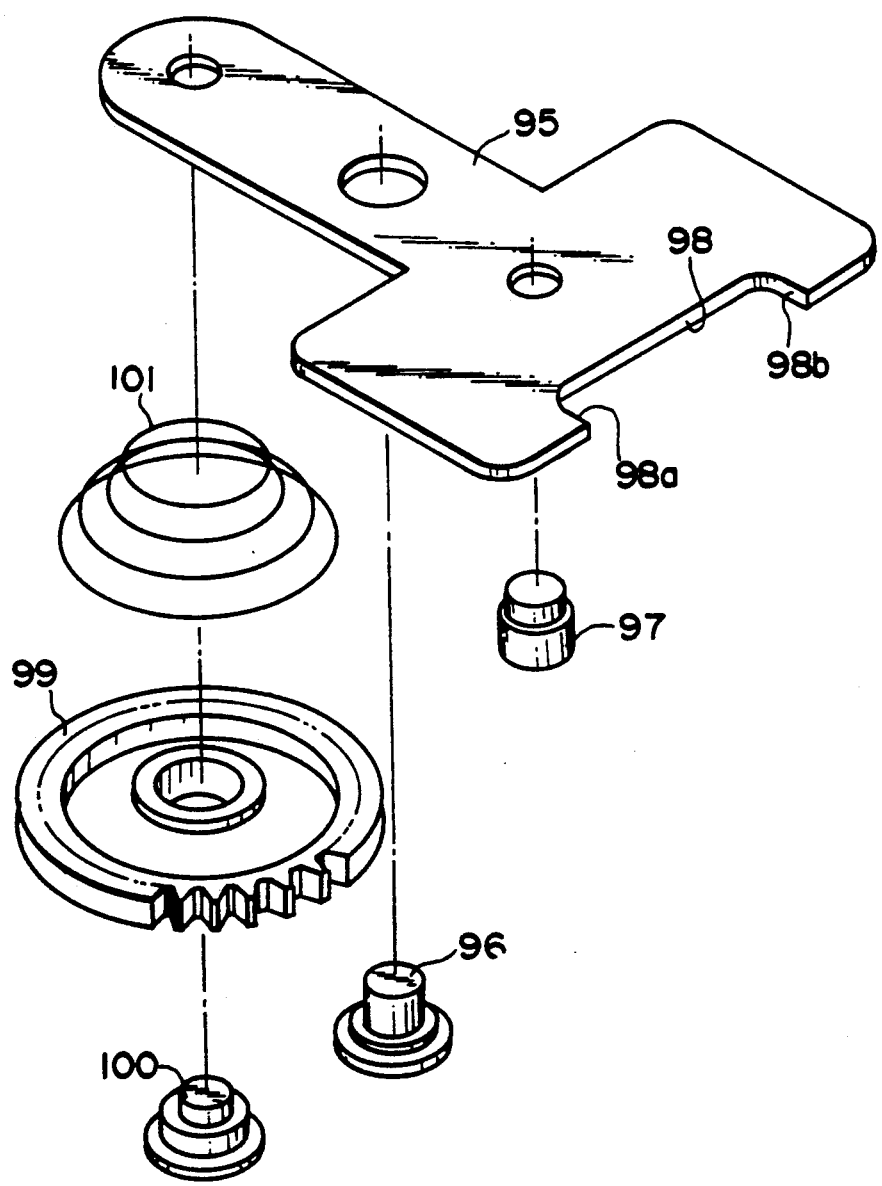
FIG. 28 is an enlarged, exploded perspective view of the reel base drive.
Figure 29:
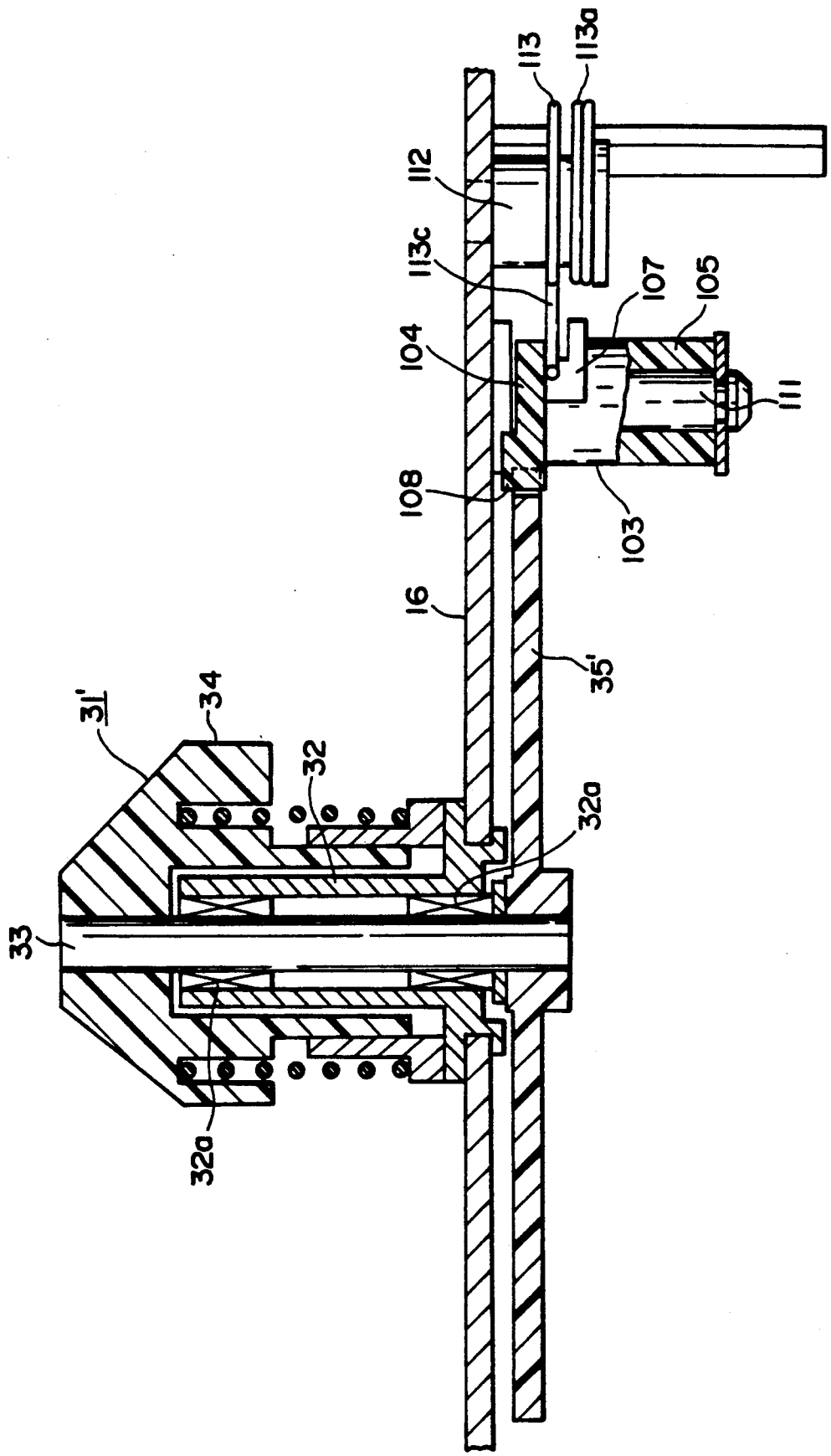
FIG. 29 is an enlarged sectional view taken along line XXIX—XXIX of FIG. 24.

A conical spring 101, shown in FIG. 28, is disposed in a contracted state between the oscillating lever 95 and the oscillating gear 99 so that the lever 95 and the gear 99 make frictional contact with each other through the conical spring 101.

When the drive gear 94 rotates, a torque in the same direction as the rotating direction of the drive gear 94 is exerted on the oscillating lever 95.

Denoted by 102 is a restrictor pin with small axial length, attached to the lower surface of the chassis 16. The restrictor pin 102 is disposed in the cutout 98 of the oscillating lever 95, so that the lever 95 is turnable within the limits which are determined by the contact of the pin 102 with the left edge 98a or right edge 98b of the cutout 98.

Figure 25:
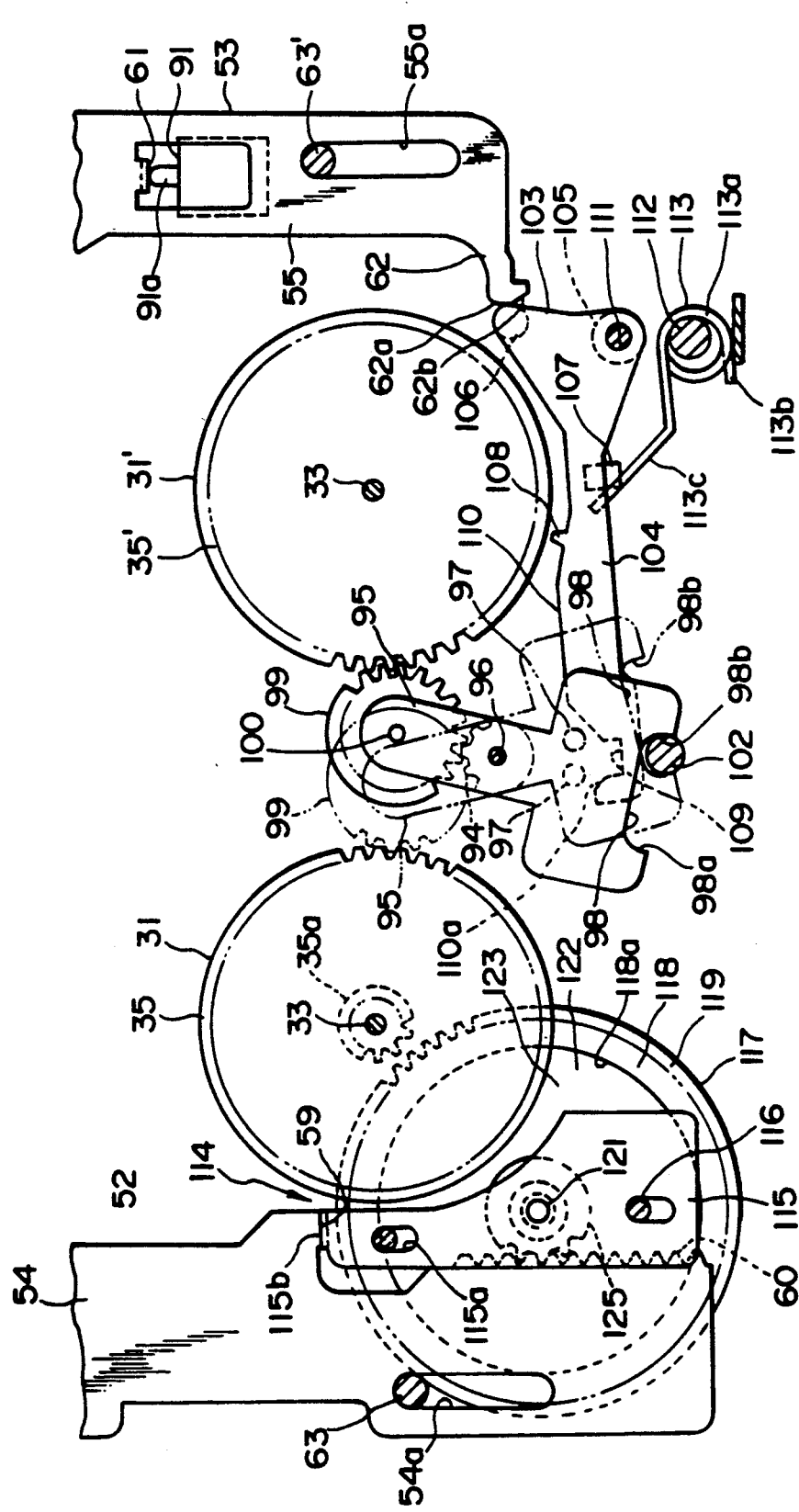
FIG. 25 is an enlarged plan view of the reel base drive, reel base lock means, and tape take-up means of the present invention, upon completion of tape loading.

When the drive gear 94 rotates clockwise as viewed from above, the oscillating lever 95 is turned clockwise until it comes to a normal position where, as shown by solid lines in FIG. 25, the turning is blocked by the contact of the right edge 98b of the cutout 98 with the restrictor pin 102. Concurrently, the oscillating gear 99 engages with the input gear 35' of the T-side reel base 31' and rotates counterclockwise, thereby rotating the input gear 35' clockwise, which in turn rotates the T-side reel base 31' in the tape takeup direction.

When the drive gear 94 is rotated counterclockwise as viewed from above, on the other hand, the oscillating lever 95 is turned counterclockwise until it comes to a reverse position where, as shown by two-dotted chain lines in FIG. 25, the turning is blocked by the contact of the left edge 98a of the cutout 98 with the restrictor pin 102. Concurrently, the oscillating gear 99 engages with the input gear 35 of the S-side reel base 31 and rotates clockwise, whereby the S-side reel base 31 is rotated in the tape takeup direction.

Until the tape loading is finished and after the tape unloading is started, the oscillating lever 95 is maintained in a nearly middle position between the normal position and the reverse position (the nearly middle position will hereinafter be referred to as "neutral position") by the compound lock lever, described below.

Figure 30:
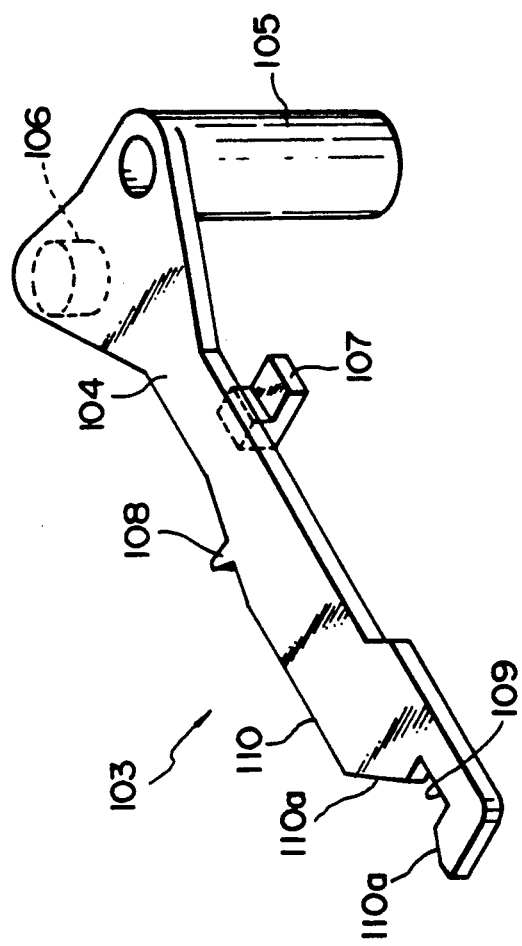
FIG. 30 is an enlarged perspective view of a compound lock lever.

The compound lock lever 103, shown in FIGS. 26 and 30, comprises, in one body: a main portion 104 having a laterally elongate flat platelike form; a hollow cylindrical portion 105 projected downward from the rear edge of a right end portion of the main portion 104; a pressed pin 106 of an axially short cylindrical form projected downward from the front edge of the right end portion; a spring stop piece 107 projected backward from the lower surface of a rear edge portion of the main portion 104 at an intermediate position with respect to the lateral extent of the rear edge portion; and an engaging pawl 108 projected substantially forward from the front edge of the main portion 104 at an intermediate position with respect to the lateral extent of the front edge.

The main portion 104 of the compound lock lever 103 is provided with a cutout 109, defined by a roughly U-shaped edge line opened to the front side, in a left end portion of the front edge 110 of the main portion 104. The lateral dimension of the cutout 109 is slightly greater than the diameter of the restricted pin 97 provided on the oscillating lever 95. Portions 110a and 110b (hereinafter referred to as "oblique edges") respectively contiguous to the left and right side edges of the cutout 109 in the front edge 110 of the main portion 104 are so directed as to fan out to the front side.

Denoted by 111 is a support shaft projected vertically from the lower surface of the chassis 16 at a position near the right end of the rear end portion of the chassis 16, and denoted by 112 is a spring support pin fixed to the lower surface of the chassis 16 at a position slightly spaced rearward from the support shaft 111.

The compound lock lever 103 is turnably supported on the support shaft 111 by inserting the shaft 111 through the hole of the hollow cylindrical portion 105 of the lever 103, and is disposed below the chasis 16 at approximately the same level as the input gear 35' of the T-side reel base 31'. The compound lock lever has its engaging pawl 108 provided on the compound lock lever 103 opposed to the input gear 35 from a substantially rear side, has its turnable end portion located on the lower side of the oscillating lever 95, and has its cutout 109 located substantially in front of the center of oscillation of the oscillating lever 95.

Denoted by 113 is a torsion spring, which has a coil portion 113a fitted over and supported by the spring support pin 112, one arm 113b fastened at its tip portion to the chassis 16, and another arm 113c elastically contacted at its tip portion by the spring stop piece 107 of the compound lock lever 103 from a substantially rear side.

Figure 24:
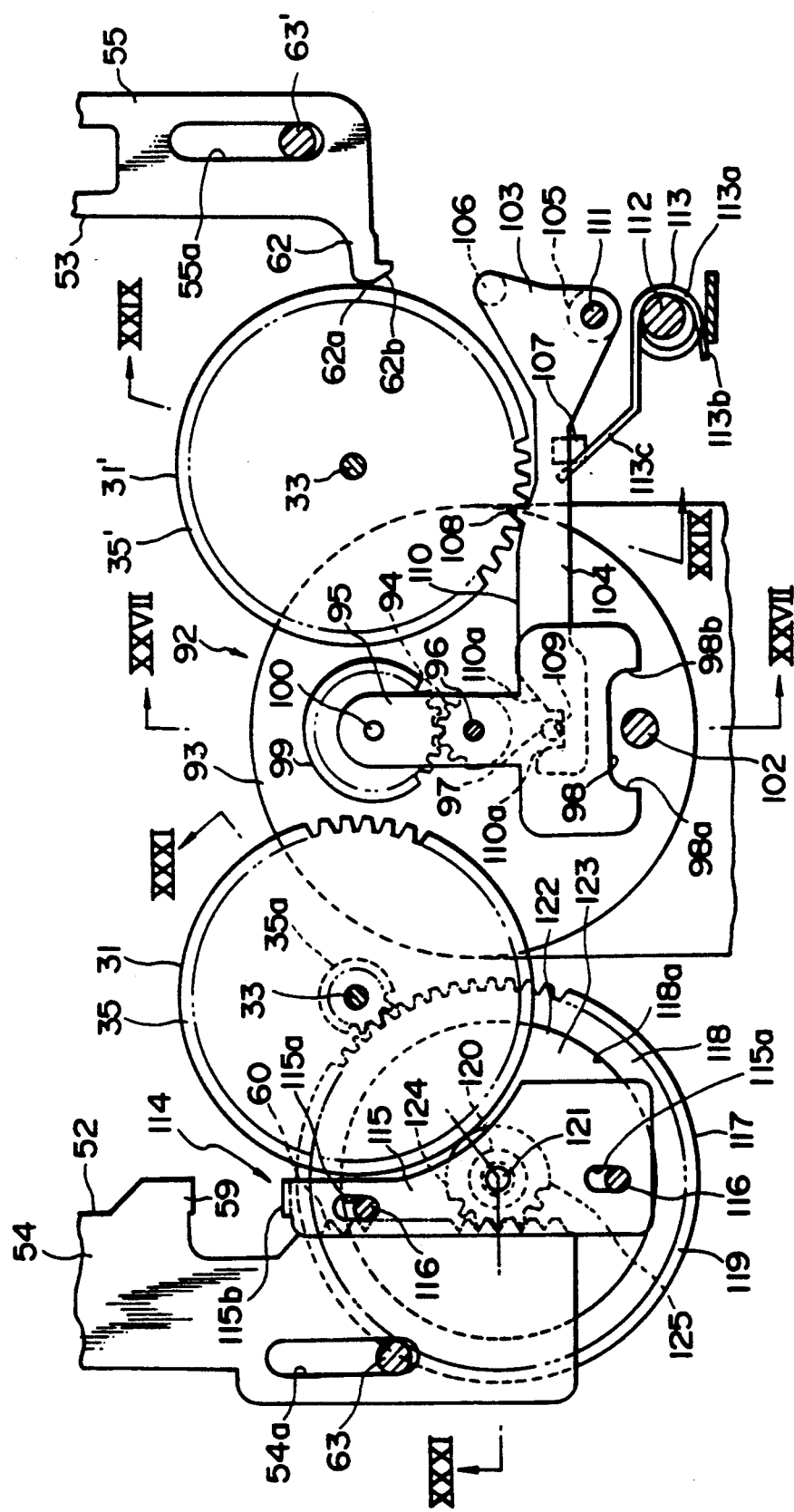
FIG. 24 is an enlarged plan view of the present invention showing a reel base drive, a reel base lock means, and a tape takeup means, before tape loading is performed.

Therefore, the compound lock lever 103 is given a clockwise torque, as viewed from above, by the resilience of the torsion spring 113 and, when not pressed counterclockwise, the lever 103 is maintained in a position where the engaging pawl 108 thereof is in mesh with a toothed portion of the input gear 35' of the T-side reel base 31' (the position hereinafter referred to as "lock position"), as shown in FIG. 24. When the compound lock lever 103 is located in the lock position, the restricted pin 97 of the oscillating lever 95 is located in the cutout 109 of the lock lever 103, whereby the restricted pin 97 is restrained from lateral movement and, hence, the oscillating lever 95 is locked in its neutral position.

If the restricted pin 97 of the oscillating lever 95 is present off the path of movement of the cutout 109 at the time of the movement of the compound lock lever 103 into the lock position, either one of the two oblique edges 110a and 110a of the lock lever 103 pushes the restricted pin 97 into the cutout 109.

The pressed pin 106 of the compound lock lever 103 is so disposed that, when the lock lever 103 is in the lock position, a substantially rightward-pointing portion of the pressed pin 106 sits touches from the left side within the path of movement of the slant edge 62b of the lever presser portion 62 of the right-hand link slider 53 (see FIG. 26) and that, before the tape loading, the lever presser portion 62 is spaced to a certain degree forward from the pressed pin 106.

When a tape loading operation is performed, therefore, the compound lock lever 103 is turned counterclockwise substantially at the same time with the completion of the operation, into a lock release position shown in FIG. 25.

Specifically, when the tape loading is carried out, the link slider 53 is moved toward its retracted position, and the lever presser portion 62 is moved rearward. Immediately before the link slider 53 reaches the retracted position, the slant edge 62b of the lever presser portion 62 makes contact with the peripheral surface of the pressed pin 106 and presses the peripheral surface to a substantially left and rear side. Next, simultaneously when the link slider 53 reaches the retracted position, the pressed pin 106 is moved relatively to ride onto the retainer edge 62a of the lever presser portion 62. As a result, the compound lock lever 103 is turned counterclockwise into the load release position and is maintained in that position by the retainer edge 62a.

Therefore, the engaging pawl 108 of the compound lock lever 103 is separated from the input gear 35' of the T-side reel base 31', whereby the T-side reel base 31' is unlocked. In addition, the cutout 109 comes out, to the rear, of the path of movement of the restricted pin 97 of the oscillating lever 95, thereby enabling the restricted pin 97 to move leftward and rightward, so that the oscillating lever 95 is released from the locked condition.

When tape loading is started under the above condition, the link lever 53 is moved forward. Substantially at the same time with the start of this movement, the lever presser portion 62 is separated from the pressed pin 106 of the compound lock lever 103. As a result, the compound lock lever 103 is moved into the lock position by the resilience of the torsion spring 113, with the engaging pawl 108 of the lock lever 103 coming into engagement with the input gear 35' of the T-side reel base 31' to thereby lock the reel base 31', and the restricted pin 97 of the oscillating lever 95 is located in the cutout 109 of the compound lock lever 103 to lock the oscillating lever 95 in the neutral position.

Until the tape loading is finished and after the tape unloading is started, the T-side reel base 31' is locked against rotation and the oscillating lever 95 is locked in the neutral position, the lockings effected in conjunction with the movement of the cover 15. During the tape loading, the magnetic tape 7 is unwound only from the S-reel 6 coupled with the S-side reel base 31 which is not being locked against rotation.

In this embodiment, both the locked condition of the T-side reel base 31' and the position of the reel base drive means are controlled by a single turnable lever. This system enables a simpler construction for tape unit.

Figure 32:
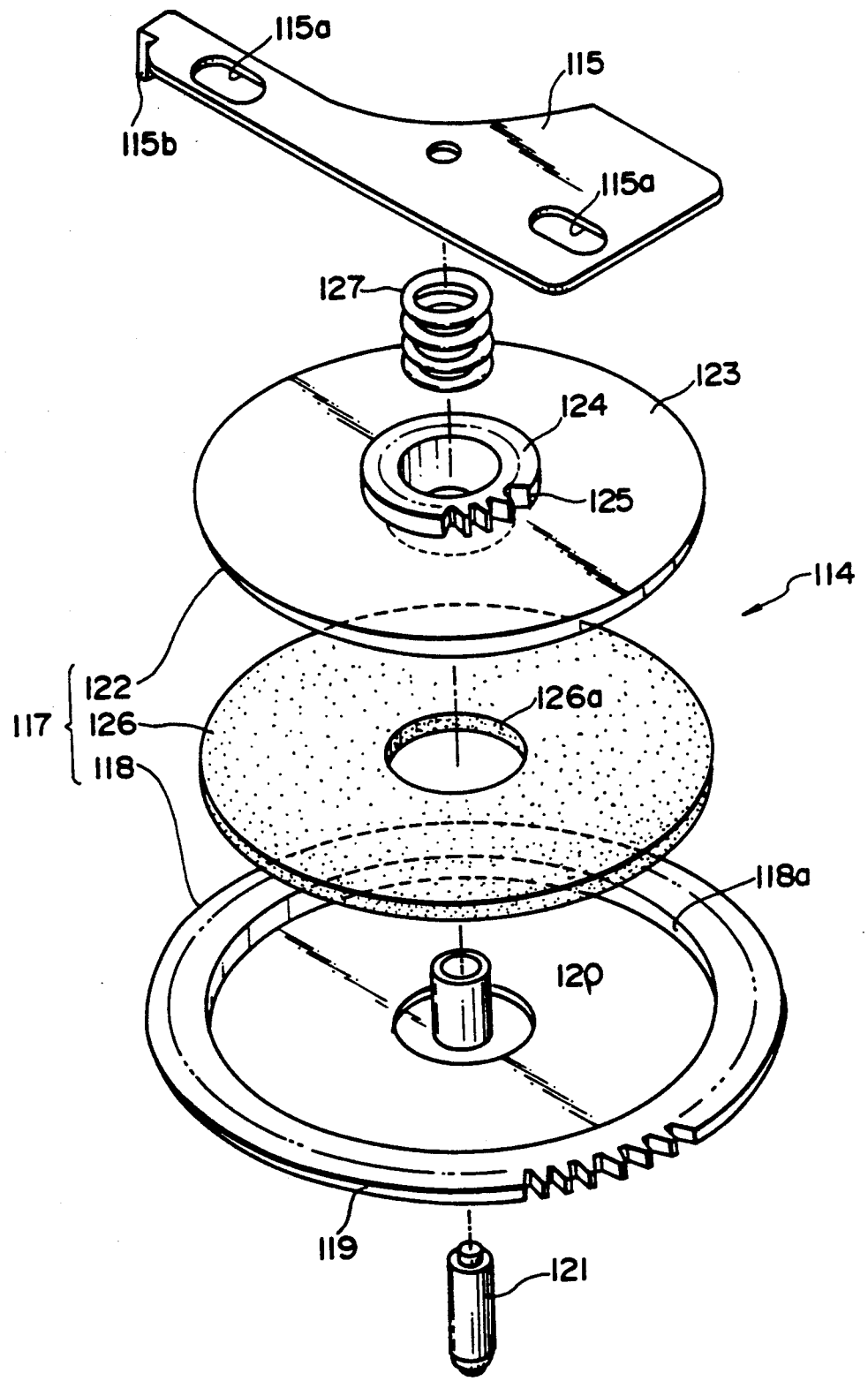
Figure 33:
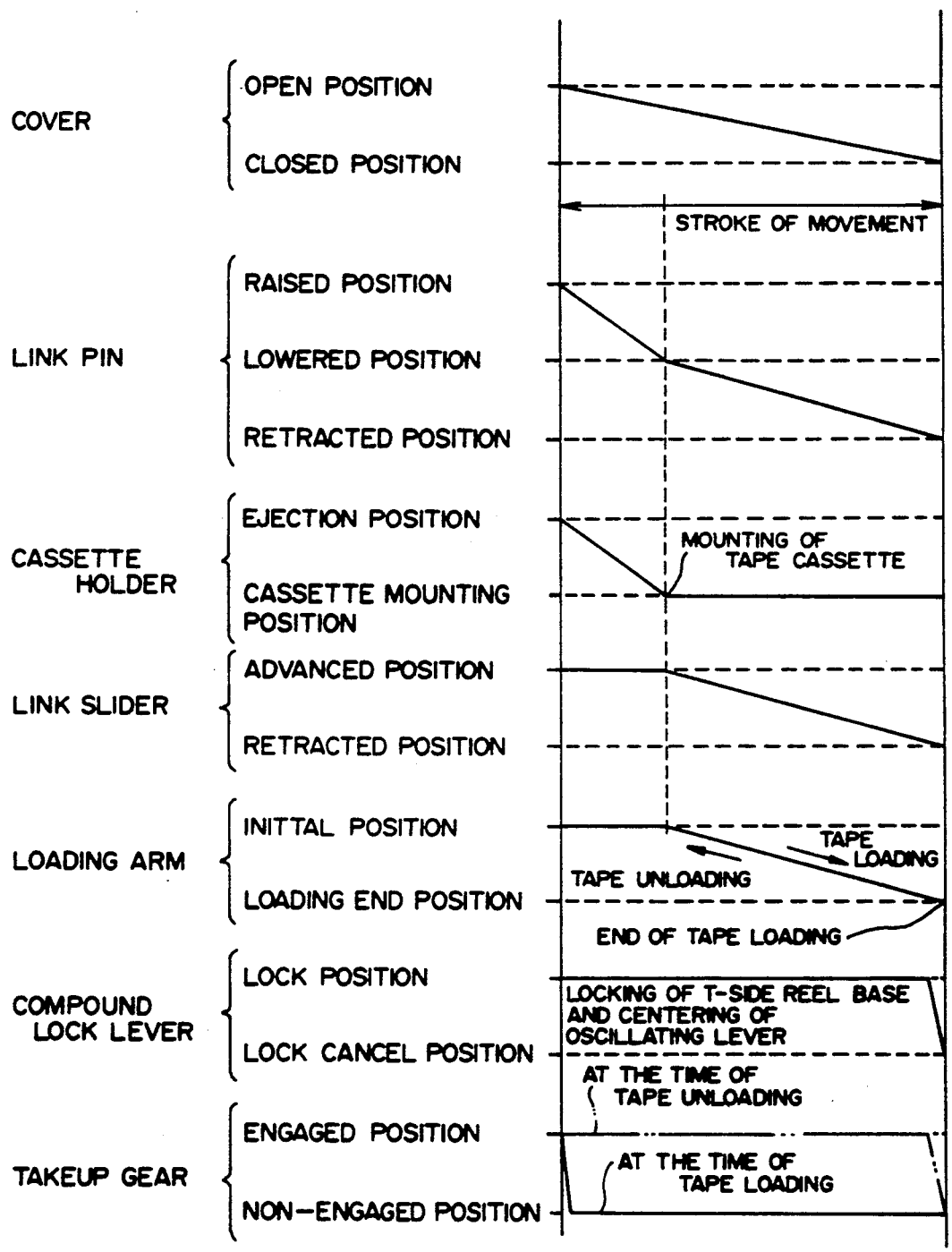
FIG. 33 is a time chart showing the variations in the positions of movable members with movement of the cover.

Denoted by 114 (FIG. 32) is takeup means by which the portion of the magnetic tape 7 having been drawn out of the cassette case 3 is taken up on the S-reel 6 when tape unloading is carried out. The takeup means 114 comprises, at least, a slidable lever supported on the chassis 16, and a takeup gear supported on the slidable lever and rotated by the left-hand link slider 52 to rotate the S-side reel base 31 in the tape takeup direction.

The slidable lever 115 is elongate in the forward-rearward direction, with its lateral width greater on the rear side and smaller on the front side. The slidable lever 115 is provided in its front and rear end portions with guided slots 115a and 115a extending in the forward-rearward direction, and at its front end portion with a locked piece 115b projected downward.

Denoted by 116 and 116 are guide pins fixed on the lower surface of the chassis 16 at positions near the rear end of a left side portion of the surface. The guide pins 116 and 116 are slidably passed through the guided slots 115a and 115a of the slidable lever 115, whereby the slidable lever 115 is supported on the chassis 16 to be slidable forward and rearward within predetermined limits. As viewed from above, the slidable lever 115 is for the most part located between the input gear 35 of the S-side reel base 31 and a rear half portion of the left-hand link slider 52. The locked piece 115b faces the lock portion 59 of the link slider 52 from the rear side.

The takeup gear denoted by 117 comprises a pair of upper and lower rotating plates, a friction plate disposed therebetween, a coil spring and a support shaft.

The lower rotating plate 118 has a circular disk form, slightly greater than the input gear 35 of the reel base 31 in diameter, with a peripheral portion formed to be slightly higher than the remaining potion and formed with a toothed portion 119 (hereinafter referred to as "larger gear portion") along the outer circumference thereof. The rotating plate 118 is provided on its upper side with a recess 118a, and a hollow cylindrical boss 120 is provided on a central portion of the bottom surface of the recess 118a.

A gear support shaft 121, projected downward from a substantially central portion of the slidable lever 115, is rotatably inserted through the boss 120, whereby the rotating plate 118 is rotatably borne on the gear support shaft 121.

The upper rotating plate 122 comprises a circular disk form main portion 123 approximately equal to the recess 118a in the lower rotating plate 118 in diameter, and an axially short hollow cylindrical boss 124, which are formed in one body. The boss 124 is formed with a toothed portion 125 (hereinafter referred to as "smaller gear portion") on its outer peripheral surface above the main portion 123, and with a spring retainer flange 124a on a lower end portion of the inner peripheral surface of its hole (see FIG. 31).

The boss 120 of the lower rotating plate 118 is passed through the hole in the boss 124 of the upper rotating plate 122, whereby the upper rotating plate 122 is rotatably supported on the gear support shaft 121 through the boss 120, with the main portion 123 of the upper rotating plate 122 opposed to the bottom surface of the recess 118a in the lower rotating plate 118.

The friction plate 126, in the form of a circular disk made of felt or the like, is provided at its center with an insertion hole 126a. The friction plate 126 is interposed between the main portion 123 of the upper rotating plate 122 and the bottom surface of the recess 118a of the lower rotating plate 118, with a lower end portion of the boss 124 of the upper rotating plate 122 inserted in the insertion hole 126a of the friction plate 126.

The coil spring 127 is fitted over the boss 120 of the lower rotating plate 118, and disposed compressed between the spring retainer flange 124a of the upper rotating plate 122 and the lower surface of the slidable lever 115. The elasticity of the coil spring 127 presses the upper and lower rotating plates 118 and 122 against each other with the friction plate 126 therebetween, and also presses the upper rotating plate 122 and the slidable lever 115 against each other.

The smaller gear portion 125 engages the rack portion 60 of the left-hand link slider 52, from the right side. Therefore, when the link slider 52 is moved rearward, its rack portion 60 exerts on the smaller gear portion 125 a pressing force having a rearward component, whereby the takeup gear 117 together with the slidable lever 115 is moved backward if the slidable lever 115 is not prevented from backward movement. The movement of the slidable lever 115 and takeup gear 117 is stopped at a position where the front ends of the guided slots 115a and 115a in the slidable lever 115 make contact with the guide pins 116 and 116, as shown in FIG. 25 (this position hereinafter referred to as "non-engaged position"). From this condition, the smaller gear portion 125 is rotated counterclockwise by the rack portion 60, and the takeup gear 117 is thereby rotated counterclockwise.

Conversely, when the link slider 52 is moved forward, its rack portion 60 applies to the smaller gear portion 125 a pressing force having a forward component, whereby the takeup gear 117 together with the slidable lever 115 is moved forward if the slidable lever 115 is not prevented from forward movement. The movement of the takeup gear 117 and slidable lever 115 is stopped at a position where the rear ends of the guided slots 115a and 115a make contact with the guide pins 116a and 116a, as shown in FIG. 24 (the position hereinafter referred to as "engaged position"). From this condition, the smaller gear portion 125 is rotated clockwise by the rack portion 60, and the takeup gear 117 is thereby rotated clockwise.

When the slidable lever 115 comes to the engaged position, the larger gear portion 119 of the takeup gear 117 is engaged to the small gear 35a integral with the input gear 35 of the S-side reel base 31 from a substantially left and rear side (see FIG. 24); when the slidable lever 115 is moved from this condition to the non-engaged position, the larger gear portion 119 is disengaged from the small gear 35a (see FIG. 25).

When the link slider 52 is located in the advanced position, its lock portion 59 is spaced to a certain extent forward from the presser piece 115b of the slidable lever 115.

Before tape loading is started, the slidable lever 115 is in the engaged position.

When the tape loading operation is started, the link slider 52 is moved rearward. Substantially concurrently with the start of this movement, the slidable lever 115 is moved toward the non-engaged position and the larger gear portion 119 of the takeup gear 117 is separated from the input gear 35 of the T-side reel base 31. At the same time that the link slider 52 reaches the retracted position, its lock portion 59 makes contact with the locked piece 115b of the slidable lever 115, thereby locking the slidable lever 115 in the non-engaged position. During this process, the tape loading is carried out; namely, the tape loading is performed in the condition where the takeup gear 117 is separate from the input gear 35 of the S-side reel base 31.

While the tape loading is performed, the takeup gear 117 is idling counterclockwise.

When the link slider 52 is moved forward from the retracted position, a movement of the slidable lever 115 toward the engaged position is started substantially simultaneously with the start of the forward movement of the link slider 52, thereby causing the takeup gear 117 to engage with the small gear 35a and to rotate clockwise. This causes the S-side reel base 31 to rotate counterclockwise, namely, in the tape takeup direction, so that takeup of tape onto the S-reel 6 is effected. Thus, the portion of the magnetic tape 7 having been drawn out of the tape cassette 2 is taken up around the S-reel 6.

The speed at which the smaller gear portion 125 is rotated by the rack portion 60 is so set that the period of time required for the S-reel 6 to take up completely the portion of the magnetic tape 7 having been drawn out of the tape cassette 2 will be shorter than the period of time necessary for the loading arms 84 and 84' to be returned from the loading end position to the initial position. Therefore, after the drawn-out tape portion is taken up on the S-reel 6, the smaller gear portion 125 of the takeup gear 117 slips relative to the greater gear portion 119, thereby ensuring that the magnetic tape 7 is taken up on the S-reel 6 without slacking.

The rotation of the S-side reel base 31 in the tape takeup direction by the takeup means 114 is performed only during the tape unloading operation, and such action of the takeup means 114 is effected by the movement of the cover 15 interlocked with the takeup means 114 through the link slider 52.

Although the operation of the R-DAT 1, particularly, the operation in conjunction with the movement of the cover 15 will be clearly understood on reading the above description, a summarized explanation of the operation will be given below.

When the cover 15 is located in the open position, the cassette holder 39 is maintained in the ejection position, the link sliders 52 and 53 are maintained in their advanced position, the movable members of the tape loading mechanism 66 such as the loading arms 84, 84′, moving blocks 67, 67′ and the like are maintained in their initial position, and the takeup gear 117 are maintained in the engaged position. The compound lock lever 103 is in the lock position to thereby prevent the T-side reel base 31′ from rotation and hold the oscillating lever 95 in the neutral position.

As the cover 15 is moved toward the closed position from this condition, first the cassette holder 39 is moved to the cassette mounting position during a nearly one-third portion of the stroke of movement of the cover 15, thereby mounting the tape cassette 2 into the cassette mount section 30. Next, during the movement of the cover 15 through the remaining portion of the stroke, the link sliders 52 and 53 are moved to their retracted position, while the takeup gear 117 is brought into the non-engaged position. Then, the moving blocks 67 and 67′ and the like are moved to the loading end position of their own, whereby tape loading is carried out. Substantially simultaneously with the completion of the tape loading, the compound lock lever 103 is moved into the lock release position, thereby releasing the locking action on the T-side reel base 31′ and the holding of the oscillating lever 95 in the neutral position.

As the cover 15 is moved toward the open position from the above condition, first the link sliders 52 and 53 are moved to the advanced position during about two-thirds of the stroke of movement of the cover 15. By the movement of the link sliders 52 and 53, the compound lock lever 103 is moved into the lock position to lock the T-side reel base 31′ and hold the oscillating lever 95 in the neutral position. Concurrently, the takeup gear 117 is moved into the engaged position to rotate the S-side reel base 31 in the tape takeup direction, and the moving block 67 and 67′ and the like are returned into their initial position. By these operations, tape unloading is performed. Then, during the subsequent movement of the cover 15 through the remaining portion of the stroke, the cassette holder 39 is moved to the ejection position and the tape cassette 2 is released from the cassette mount section 30.

As has been stated above, in the tape unit according to this invention, the two operations carried out in succession before the start of recording or reproduction (playback) of information on a tape, namely, the mounting of the tape cassette into the cassette mount section by moving the cassette holder and the tape loading by operating the tape loading mechanism, are carried out when the cover for closing and opening the opening side of the cassette mount section is moved from the open position to the closed position. Therefore, the recording or reproduction (playback) can be started immediately after completion of the process for closing the opening side of the cassette mount section.

The operation of the tape loading mechanism is effected by the force associated with the process for moving the cover to the closed position. It is therefore possible to omit drive means conventionally needed for driving the tape loading mechanism. Also, it is unnecessary to provide sensors for detection of the tape cassette having been mounted in the cassette mount section or of completion of a tape loading operation. These features of the tape unit of this invention promise a simpler construction and marked reductions in size and cost.

Furthermore, in the tape unit according to this invention, the three operations needed prior to ejection of the tape cassette, namely, the putting of the tape loading mechanism into the initial condition, the takeup of the tape portion having been drawn out of the tape cassette onto one of tape reels and the movement of the cassette holder into the ejection position, are carried out in a predetermined sequence during which the cover for closing and opening the opening side of the cassette mount section is moved from the closed position to the open position. It is therefore possible for the process for removing the tape cassette to be started immediately after the recording or reproduction (playback) of information on the tape is finished. Additionally, the operations of the tape loading mechanism and the tape takeup means are effected by the force associated with the process for moving the cover from the closed position to the open position. This makes it possible to omit some conventionally needed means such as drive means for the tape loading mechanism, control means for the tape takeup means, and control means for permitting the movement of the cassette holder to the ejection position when completion of the tape unloading operation is detected. These features of the tape unit according to this invention promise a greatly simplified construction and remarkable reductions in size and cost.

It should be noted that the shape and construction of each of members, mechanisms and means, and the kinds of the tape unit and the like, as described in the above embodiment, are presented only for illustrating an example of carrying out this invention and are not to be construed as limiting the technical scope of the invention.

In particular, the above embodiment has been described with reference to the case where the S-reel, namely, so-called supply-side tape reel is the tape reel on which to take up the tape in carrying out the tape unloading operation, but the takeup of the tape in the tape unloading process may be made on the T-reel, namely, so-called takeup-side tape reel.

What is claimed is:

1. A tape unit for a tape cassette comprising:
   a cassette mount section for detachably mounting the tape cassette therein, said cassette mount section having at least two reel bases for engagement respectively with two tape reels of the tape cassette;
   a cover movably supported on a chassis, said cover being movable in first and second strokes between an open position for opening said cassette mount section and a closed position for closing said cassette mount section, respectively;
   a cassette holder movably supported on said chassis, said cassette holder being movable between an ejection position for insertion and removal of the tape cassette and a cassette mounting position for mounting the tape cassette in said cassette mount section;

tape-loading means for drawing a portion of tape out of the tape cassette mounted in said cassette mount section and causing the tape portion to pass through a predetermined tape path; and link means for linking said cassette holder and said tape-loading means to said cover such that said first stroke of said cover from the open position toward the closed position moves said cassette holder from said ejection position to said cassette mounting position to mount the tape cassette into said cassette mount section, and said second stroke of said cover subsequent to said first stroke operates said tape-loading means to perform tape loading.

2. The tape unit according to claim 1, wherein the cover is further movable between the closed position for closing said cassette mount section and the open position for opening said cassette mount section, respectively;

and wherein said tape unit further comprises tape takeup means releasably linked to one tape reel of the tape cassette and rotating said one tape reel in a tape takeup direction to thereby take up the tape portion drawn out of the tape cassette by said tape-loading means, wherein said tape-loading means is movable between a tape loading position where the tape portion drawn out of the tape cassette mounted in said cassette mount section passes through the predetermined tape path and an initial position where the tape portion is not drawn out of the tape cassette, and said link means links said cassette holder, said tape takeup means and said tape-loading means to said cover such that said first stroke of said cover from the closed position toward the open position brings said tape-loading means into the initial position and causes said tape takeup means to rotate said linked tape reel to take up the portion of tape drawn out of the tape cassette, and said second stroke of said cover subsequent to said first stroke moves said cassette holder from said cassette mounting position to said ejection position.

3. The tape unit according to claim 1, wherein said tape unit further comprises tape takeup means releasably linked to one tape reel of the tape cassette and rotating said one tape reel in a tape takeup direction to thereby take up the tape portion drawn out of the tape cassette, wherein said tape-loading means is movable between a tape loading position where the tape portion drawn out of the tape cassette mounted in said cassette mount section passes through the predetermined tape path and an initial position where the tape portion is not drawn out of the tape cassette, and said link means links said cassette holder, said tape takeup means and said tape-loading means to said cover, such that said first stroke of said cover from the open position toward the closed position moves said cassette holder to a cassette mounting position, and said second stroke of said cover subsequent to said first stroke moves said tape-loading means from said initial position to said tape loading position to perform tape loading, said tape takeup means being released from said one tape reel at least upon completion of the tape loading, and that said first stroke of said cover from the closed position toward the open position causes said tape takeup means to link with said one tape reel so as to rotate said one tape reel and take up the drawn out tape portion, and moves said tape-loading means from said tape loading position to said initial position, and said second stroke of said cover subsequent to said first stroke from the closed position toward the open position causes said cassette holder to be moved from said cassette mounting position to said ejection position.

4. The tape unit according to claim 1, wherein said tape unit further comprises:

means for driving said reel bases, said reel base drive means movable between three positions, the three positions including two positions for selectively linking said reel base drive means with either of said two reel bases, and a neutral position for non-linkage with any of said reel bases;

restrictor means movable between a restricted position for restricting the movement of said reel base drive means and a released position for allowing movement of said reel base drive means; and lock means movable between a lock position for preventing the rotating of one of said reel bases and a release position for permitting the rotation of one of said reel bases, wherein the movement of said cover from the open position toward the closed position causes said link means to move said tape-loading means, whereby tape loading is performed, said restrictor means and said lock means being maintained respectively in the restricted position and the lock position while the tape loading is performed by said tape-loading means, and said restriction means and said lock means being moved respectively into the release positions substantially simultaneously with completion of the tape loading.

5. The tape unit according to claim 4, wherein said reel base drive means comprises a motor and an oscillating arm which receives a rotational drive force transmitted from said motor and is capable of oscillating between and linking with the two reel bases in response to the rotating direction of the motor, said oscillating arm supporting an oscillation gear at one end thereof, said oscillating gear capable of rotating in forward and reverse directions, and said restrictor means and said lock means are arranged as a single compound lock lever, said compound lock lever capable of engaging with said oscillating arm to restrict the oscillation of said oscillating arm and to lock said oscillating arm in a neutral position for non-linkage with any of said two reel bases, said compound lock lever capable of engaging with one of said reel bases to prevent the rotation of said reel base, wherein a movement of said cover from the open position toward the closed position causes said link means to release said compound lock lever from said oscillating arm.

6. A tape unit for a tape cassette comprising:

a cassette mount section for detachably mounting the tape cassette therein, said cassette mount section having at least two reel bases for engagement respectively with two tape reels of the tape cassette;

a cover movably supported on a chassis, said cover being movable in first and second strokes between a closed position for closing said cassette mount section and an open position for opening said cassette mount section, respectively;

a cassette holder movably supported on said chassis, said cassette holder being movable between an ejection position for insertion and removal of the tape cassette and a cassette mounting position for mounting the tape cassette in said cassette mount section;

a tape-loading means for drawing a portion of the tape out of the tape cassette mounted in said cassette mount section and causing the tape portion to pass through a predetermined path, said tape loading means movable between a tape loading position where a portion of tape drawn out of the tape cassette mounted in said cassette mount section passes through the predetermined tape path and an initial position where the tape portion is not drawn out of the tape cassette;

tape takeup means capable of being releasably linked to one tape reel of the tape cassette and rotating said one tape reel in a tape takeup direction to thereby take up the tape portion drawn out of the tape cassette by said tape-loading means; and a link means for linking said cassette holder, said tape takeup means and said tape-loading means to said cover such that said first stroke of said cover from the closed position toward the open position brings said tape-loading means into the initial position and causes said tape takeup means to rotate said one tape reel to take up the portion of tape drawn out of the tape cassette, and said second stroke of said cover subsequent to said first stroke moves said cassette holder from said cassette mounting position to said ejection position.

7. The tape unit according to claim 6, wherein said tape unit further comprises resilient means for urging said tape-loading means from the tape loading position where the tape portion drawn out of the tape cassette mounted in said cassette mount section passes through the predetermined tape path and the initial position where the tape portion is not drawn out of the tape cassette.

* * * * *

UNITED STATES PATENT AND TRADEMARK OFFICE
CERTIFICATE OF CORRECTION

PATENT NO. : 5,291,352
DATED : March 1, 1994
INVENTOR(S) : Tsuyoshi Nagasawa

It is certified that error appears in the above-indentified patent and that said Letters Patent is hereby corrected as shown below:

```
Col. 3,
        line 4, delete "said"
        line 23, "The" should start a new paragraph
        line 34, delete "said"
        line 38, delete "said"
        line 40, delete "said"
        line 44, "The" should start a new paragraph
        line 59, delete "said"
Col. 4, line 66, delete "said"
Col. 5, line 11, after "of" first occurrence, insert --the--
        same line, change "the the" to --the--
Col. 6, line 38, delete "and"
        line 39, change "," to --and--
        line 41, delete "and"
        line 42, change "," to --and--
Col. 7, line 61, after "6," insert --namely,--
Col. 11, line 7, after "," delete "-"
```

UNITED STATES PATENT AND TRADEMARK OFFICE
CERTIFICATE OF CORRECTION

PATENT NO. : 5,291,352
DATED : March 1, 1994
INVENTOR(S) : Tsuyoshi Nagasawa

It is certified that error appears in the above-indentified patent and that said Letters Patent is hereby corrected as shown below:

```
Col. 12, line 12, after "D" insert --of--
         line 14, change "extended" to --extend--
         line 31, after "44, 44" delete "-"
         line 45, after "47" insert --and 46', 47',--
         line 46, delete "and 46', 47'"
Col. 15, line 44, after "portions" delete ","
         line 57, after "direction" insert --,--
Col. 16, line 24, after "respectively" insert --,--
         line 50, after "located" delete ","
Col. 17, line 44, after "19," insert --blocks--
Col. 21, line 51, after "75'" insert --,--
Col. 25, line 49, delete "touches"

Col. 32, line 27, change "rotating" to --rotation--
```

Signed and Sealed this

Seventeenth Day of October, 1995

BRUCE LEHMAN

*Attest:*

*Attesting Officer*   Commissioner of Patents and Trademarks